United States Patent
Gilson

(10) Patent No.: US 9,832,070 B2
(45) Date of Patent: Nov. 28, 2017

(54) COMMUNICATION TERMINAL WITH MULTIPLE VIRTUAL NETWORK INTERFACES

(75) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1191 days.

(21) Appl. No.: 12/618,502

(22) Filed: Nov. 13, 2009

(65) Prior Publication Data

US 2011/0116513 A1    May 19, 2011

(51) Int. Cl.
  *H04L 29/12*    (2006.01)
  *H04L 29/08*    (2006.01)
  *H04L 29/06*    (2006.01)

(52) U.S. Cl.
  CPC .... *H04L 29/12952* (2013.01); *H04L 61/6077* (2013.01); *H04L 69/32* (2013.01); *H04L 29/12226* (2013.01); *H04L 61/2015* (2013.01); *H04L 69/14* (2013.01)

(58) Field of Classification Search
  CPC . H04L 61/6077; H04L 61/2015; H04L 69/14; H04L 69/32; H04L 29/12952
  USPC ........................................................ 370/469
  See application file for complete search history.

(56) References Cited

U.S. PATENT DOCUMENTS

| | | | | |
|---|---|---|---|---|
| 6,684,243 | B1 * | 1/2004 | Euget et al. ................... | 709/222 |
| 6,993,026 | B1 * | 1/2006 | Baum .................. | H04L 12/4633 |
| | | | | 370/392 |
| 7,171,492 | B1 * | 1/2007 | Borella et al. ................. | 709/245 |
| 2007/0121644 | A1 | 5/2007 | Hurtta | |
| 2008/0107109 | A1 * | 5/2008 | Michaud ........................ | 370/390 |
| 2008/0117919 | A1 * | 5/2008 | Kliger ................... | H04L 69/324 |
| | | | | 370/400 |
| 2009/0161601 | A1 | 6/2009 | Dai et al. | |
| 2011/0001833 | A1 * | 1/2011 | Grinkemeyer ......... | H04H 20/12 |
| | | | | 348/192 |

OTHER PUBLICATIONS

Shanmugan, Ramadas, et. al. "Special Edition Using TCP/IP, Second Edition" Que Publishing—May 2002.*
Biersdorfer, J.D. "I See IPTV on PC" The New York Times. Jan. 28, 2009.*
Shanmugan, Ramadas, et. al. "Special Edition Using TCP/IP, Second Edition" Chapter 3. Que Publishing—May 2002.*
European Search Report for EP10190064 dated Jan. 19, 2011.
Perkins, "Mobile Networking Through Mobile IP", IEEE Internet Computing, IEEE Service Center, vol. 2. No. 1, Jan. 1, 1998, pp. 1-12.
Canadian Office Action—CA App 2,720,323—dated Sep. 7, 2016.

* cited by examiner

*Primary Examiner* — Stephen J Clawson
(74) *Attorney, Agent, or Firm* — Banner & Witcoff, Ltd.

(57) ABSTRACT

A communication terminal communicates protocol data units across a first virtual interface and a shared interface. The first virtual interface corresponds to an upper layer protocol and a first logical network. The shared interface corresponds to a lower layer protocol. The terminal also communicates protocol data units across a second virtual interface and the shared interface, with the second virtual interface corresponding to the upper layer protocol and a second logical network. The first logical network can be a wide area network that includes devices within a premises and devices outside a premises, and the second logical network may be a local area network that only includes devices within the premises.

25 Claims, 16 Drawing Sheets

COMMUNICATION TERMINAL WITH MULTIPLE VIRTUAL NETWORK INTERFACES

BACKGROUND

Set top terminal (STT) devices are typically deployed in numerous premises throughout subscriber networks that serve numerous households and/or businesses over a wide region. STTs in a subscriber network receive programming from the network in a downstream direction, demodulate and otherwise process that data, and output content for display on a television or other customer device. STTs also communicate data upstream to the subscriber network head end. Subscriber networks used to deliver programming content are also used to provide high speed data and other types of services to subscribers, with those other services also requiring upstream and downstream communications with devices in a subscriber premises.

Upgrade of subscriber network head ends to comply with the OCAP (OpenCable Application Platform) and DSG (DOCSIS Set-Top Gateway) specifications promulgated by Cable Television Laboratories, Inc. can result in some head ends that are no longer able to receive upstream signals from certain STTs. This is believed to be caused by subscriber premises wiring that allots approximately half of the RF signal power to cable modems and the remaining signal power among all other devices. STTs in such an environment may be unable to output enough upstream RF power to effectively communicate with the head end. One possible solution to this problem is to route upstream STT communications through a cable modem in the same premises. Indeed, many newer STTs include a MoCA (Multimedia over Coax Alliance) interface. As is known in the art, MoCA defines layer 1 and layer 2 protocols for communicating data over coaxial cable.

Although an STT could be configured to use an existing MoCA interface for upstream data communications routed through a cable modem, this could present other problems. If an STT's MoCA interface is used for upstream communications with a head end, those communications should not pass through a router in the subscriber premises. If an STT is connected to a cable modem through a router, the head end may have difficulty polling the STT. If an STT's MoCA interface is connected directly to a cable modem, however, other devices in the home may not be able to communicate to the STT. Notably, STTs increasingly include features that allow multiple STTs to network with each other and with computers and other devices in the premises (e.g., to share media in different rooms). Using an STT MoCA interface for upstream communications with the head end could thus preclude that STT from implementing certain home networking features. Although an STT could be constructed with multiple MoCA interfaces, adding hardware to implement multiple MoCA interfaces could significantly increase STT unit cost.

Networking multiple STTs through their respective MoCA interfaces also presents other challenges. As developers create more and more features that rely on an in-home MoCA-based network, those designers are less likely to be aware of other developers' efforts, and thus more likely to create features that might conflict with features of other developers' software. Although it is possible to create multiple physical channels in a MoCA RF frequency band, inter-channel interference can result.

SUMMARY

This Summary is provided to introduce a selection of concepts in a simplified form that are further described below in the Detailed Description. This Summary is not intended to identify key features or essential features of the invention.

In at least some embodiments, a communication terminal such as a set top terminal (STT) is configured to communicate in a physical network and is joined to that physical network by a first communication medium. The physical network may include devices within a premises and devices located outside the premises. The first communication medium can be a local coaxial cable plant to which the set top terminal is connected, and the physical network may include other portions in which devices communicate across a different type of communication medium. The STT communicates protocol data units (PDUs) across both a first virtual interface and a shared interface. The first virtual interface corresponds to an upper layer protocol (e.g., transmission control protocol (TCP), user datagram protocol (UDP), internet protocol (IP)) and to a first logical network. The shared interface corresponds to a lower layer protocol. The STT also communicates PDUs across both a second virtual interface and the shared interface, with the second virtual interface corresponding to the upper layer protocol and to a second logical network. The first virtual interface also corresponds to a first address applicable to the STT in the first logical network but not in the second logical network, while the second virtual interface corresponds to a second address applicable to the communication terminal in the second logical network but not in the first logical network. The first logical network can be a wide area network that includes devices within a premises and devices outside a premises, and the second logical network may be a local area network that only includes devices within the premises.

DETAILED DESCRIPTION

As used herein, and as the context requires, a "network" can be a logical or a physical network (or both). A physical network includes physically separate devices that communicate with each other across one or more types of communication media. A communication medium can be wired (e.g., coaxial cable, optical fiber, electrical conductor) or non wired (e.g., wireless radio communications through free space). A logical network includes devices that communicate across one or more types of communication media, but where all of those devices have an address recognized by one or more other devices in the same logical network. Two different logical networks can use the same communication medium (or media) and addressing protocol (e.g., internet protocol (IP) addresses). However, devices in a first of those logical networks may have addresses that are valid in the first logical network but not in a second of the logical networks. Similarly, devices in the second logical network may have addresses that are valid in the second logical network but not in the first logical network.

Certain embodiments are described below using examples of physical networks that include multiple portions in which communications occur over a coaxial cable medium. The invention is not limited to embodiments in which multiple portions of a physical network (or in which interconnected physical networks) utilize coaxial cable. For example, some embodiments include implementations in an FTTH (Fiber to the Home) environment where the physical network of a subscriber network is connected to the physical network of a home (or other premises) by an optical fiber that terminates in an ONT (Optical Network Terminal) in the premises. In such some such embodiments, the ONT may convert downstream optical communication signals into electrical signals for communication to elements within the premises over another medium (e.g., coaxial cable or other electrically conductive network cable), and may convert upstream electrical communication signals into optical signals for communication to the subscriber network.

Figure 1:
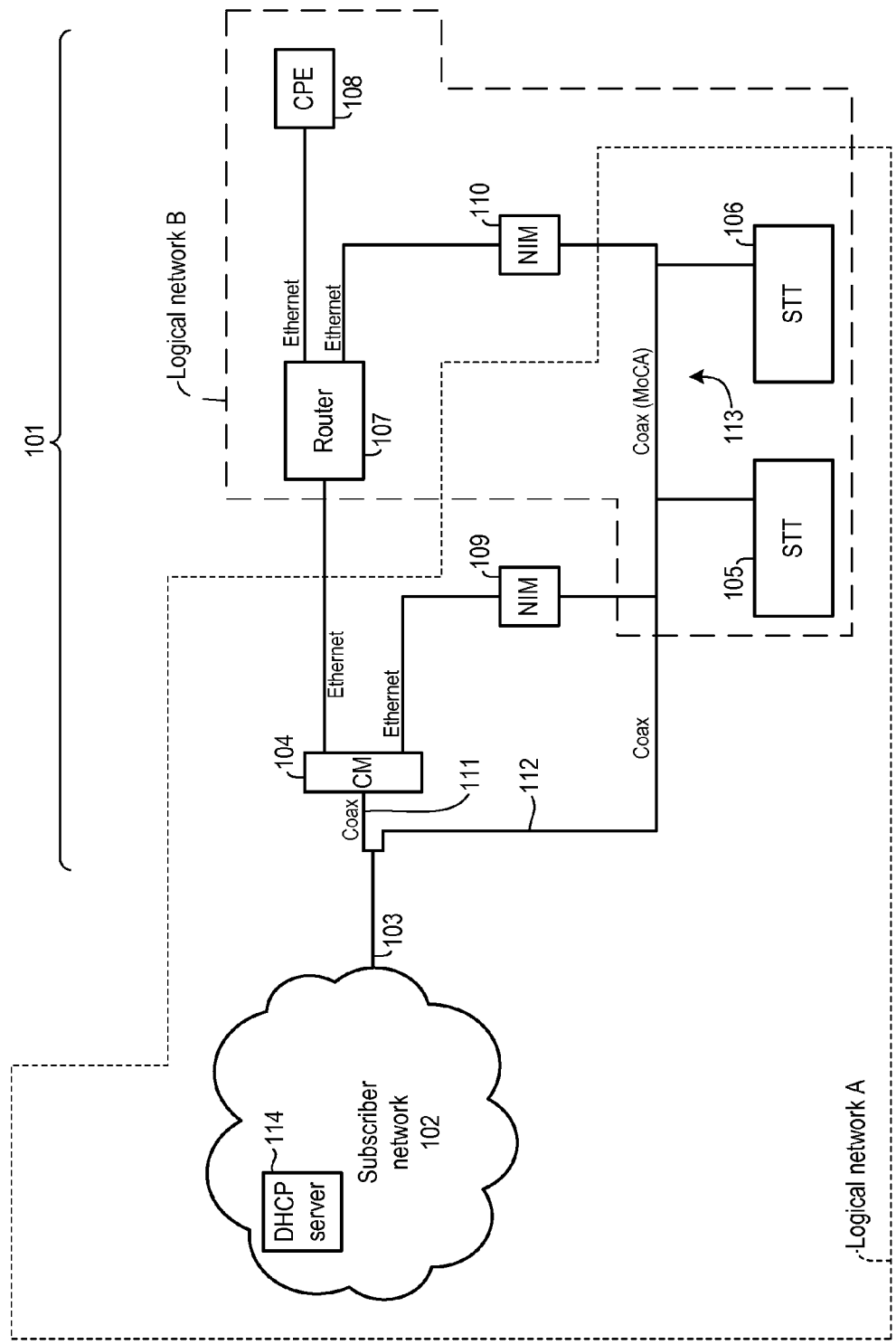
FIG. 1 is a block diagram showing a subscriber premises having set top terminals (STTs) according to at least some embodiments.

FIG. 1 is a block diagram showing a physical network of devices in a subscriber premises 101, with the physical network of premises 101 joined to a second (external) physical network 102. The physical network of premises 101 includes set top terminals (STTs) according to at least some embodiments. In the embodiment of FIG. 1, network 102 provides multiple types of services to premises 101 and to the premises of many other subscriber premises (not shown) that are similarly joined to and served by network 102. Those services can include broadcast video, video-on-demand (VOD) and other types of services commonly associated with cable television (CATV). Those services may also include high speed data service (e.g., access to the public Internet), voice over internet protocol (VoIP) telephony service, and other types of services. For simplicity, network 102 is represented by a single cloud connected to premises 101 via a coaxial cable drop 103. Network 102 includes a hybrid fiber coaxial access network connecting the physical network of premises 101 to a cable modem termination system (CMTS) and other head end elements through which content and other data is communicated between network 102 and premises 101. Although omitted from FIG. 1 for simplicity, similar connections to other premises may also be present. Except as set forth below, the elements of network 102 are well known and operate in a conventional manner. Elements of network 102 are not further described except to explain features that may not operate in a conventional manner.

The physical network within premises 101 includes a cable modem (CM) 104, a first STT 105, a second STT 106, a router 107, a customer premises device 108, and two network interface modules (NIM) 109 and 110. As described in more detail below in connection with FIG. 7, one or more of the components shown within premises 101 (e.g., cable modem 104, router 107 and NIMs 109, 110) can be consolidated into a single physical device. Coaxial feeder cable 103 is connected to a splitter (not shown) at premises 101. One coaxial line 111 connects that splitter to cable modem 104. Another coaxial line 112 connects the splitter to a local coaxial cable plant 113 within premises 101. As described below, STTs 105 and 106 are connected to local coaxial cable plant 113 and configured to communicate with each other, with the head end of network 102 and with CPE device 108. CPE device 108, which may be a personal computer or other type of general purpose computing device, an in-home media server, or another type of device, is connected to an Ethernet port of router 107.

Local coaxial cable plant 113 is the communication medium that joins STTs 105 and 106 to the physical network of premises 101 and to various logical networks described below. Plant 113 physically connects STTs 105 and 106 to a MoCA (Multimedia over Coaxial Alliance) interface of NIM 109 and to a MoCA interface of NIM 110. An Ethernet interface of NIM 109 is physically connected to a first Ethernet port of cable modem 104. An Ethernet interface of NIM 110 is physically connected to an Ethernet port of router 107. Each of NIM 109 and 110 bridges MoCA and Ethernet communications and is configured to convert MoCA-formatted communications received on the MoCA interface to Ethernet frames for output on the Ethernet interface, and vice versa. Each of NIM 109 and NIM 110 can be a conventional MoCA/Ethernet NIM such as is known in the art. Cable modem 104, router 107 and CPE device 108 can similarly be conventional devices.

Local coaxial plant 113 carries MoCA-based communications in a first part of the radio frequency (RF) spectrum. In some embodiments, for example, MoCA-based communications in local coaxial plant 113 are carried in RF channels above 1150 MHz. Local coaxial plant 113 also carries communications received from network 102 (via coaxial line 112) in a second portion of the RF spectrum. Downstream communications from network 102 may, for example, be carried in RF channels below 1000 MHz.

STT 105 communicates with other devices in premises 101 using MoCA-based communications. STT 105 has a single MoCA interface, as described below, corresponding to layers 1 and 2 of the OSI (Open System Interconnection) reference model. As also explained below, however, STT 105 is configured to communicate through that single layer 1/layer 2 interface using any of multiple virtual interfaces that corresponds to one or more higher layers of the OSI model. Each of those virtual interfaces may also correspond to one of the separate Internet Protocol (IP) addresses discussed below. In some embodiments, and as is also described in more detail below, each virtual interface may further correspond to layer 2 and have its own media access control (MAC) address.

STT 106 similarly communicates with other devices in premises 101 using MoCA-based communication. STT 106 also has a single MoCA layer 1/layer 2 interface used by multiple virtual interfaces corresponding to one or more higher layer protocols. Each of STTs 105 and 106 uses a first of its multiple virtual interfaces to communicate in a first logical network A that includes STT 105, STT 106, NIM 109, cable modem 104, DHCP (dynamic host configuration protocol) server 114 and other head end elements of network 102. STT 105 and STT 106 each uses a second of its virtual interfaces to communicate in a second logical network B includes STT 105, STT 106, NIM 110, router 107 and CPE device 108. Devices in logical network A have IP addresses that are valid in logical network A but not valid in logical network B. Devices in logical network B have IP addresses that are valid in logical network B but not valid in logical network A. Devices that communicate in both logical networks (e.g., STTs 105 and 106) will have a separate IP address and virtual interface for each logical network.

Figure 2:
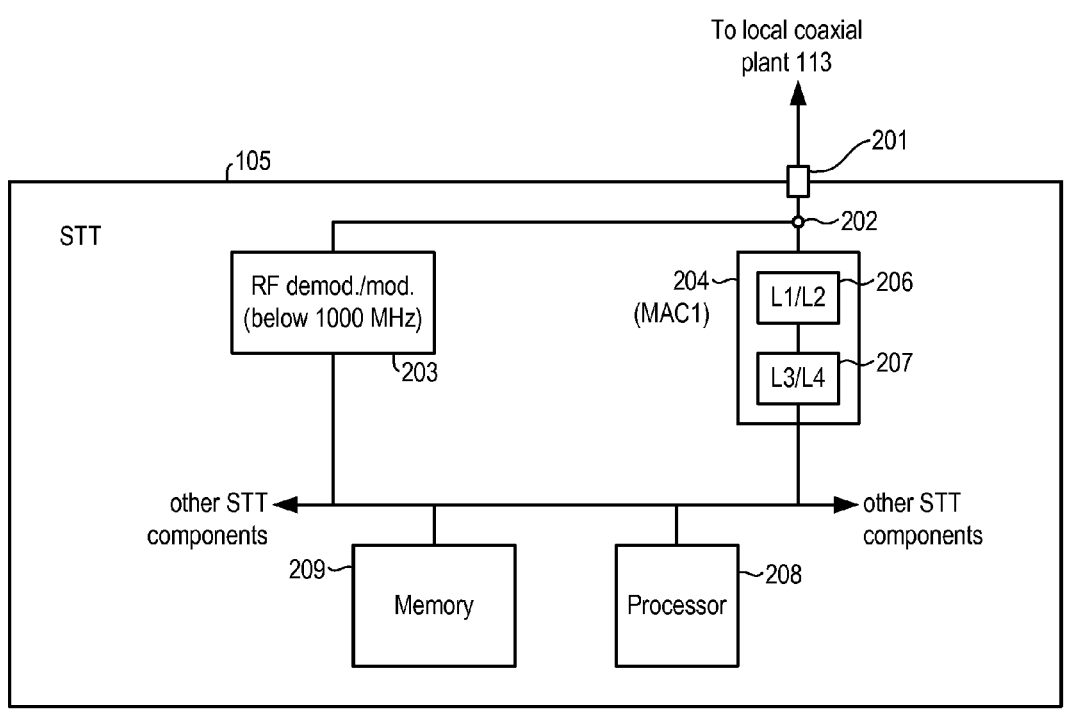
FIG. 2 is a block diagram of a portion of an STT from FIG. 1 showing additional details according to some embodiments.

FIG. 2 is a block diagram showing additional details of STT 105. STT 105 includes a physical coupler 201 that physically couples STT 105 to the communication medium over which STT 105 communicates. In the embodiment of FIGS. 1-5, coupler 201 is a coaxial cable coupler that joins STT 105 to a physical network by electrically and mechanically coupling STT 105 to the terminal end of a coaxial cable in local coaxial cable plant 113. In other embodiments, a connection module may join an STT to a physical network using a coupler that electrically and mechanically connects to another type of electrical communication medium (e.g., an RJ45 connector for coupling to an Ethernet network), a coupler that mechanically connects to another type of medium for optical communication (e.g., an optical network connector), or a coupler that does not have a mechanical connection to the communication medium (e.g., an antenna in a wireless network).

Coupler 201 is connected via a splitter 202 to a conventional RF demodulation/modulation module 203. STT 105 uses module 203 to demodulate non-MoCA communications from network 102 in RF channels below 1000 MHz. Such channels may be used to carry broadcast programming content, video on demand (VOD) content, and other types of content typically associated with cable television (CATV) service. Module 203 can also be used to modulate and transmit upstream signals to network 102 in one or more RF channels below 1000 MHz. Because devices for demodulation and modulation of signals used to carry CATV and other content in RF channels below 1000 MHz are well known, additional details of module 203 are not included. Demodulated downstream communications from network 102 are output by module 203 to a bus 205 of STT 105 for further processing by other components of STT 105.

Coupler 201 is also connected via splitter 202 to a multi-network communication module 204. STT 105 uses module 204 for communications with devices in premises 101 and, as discussed in more detail below, for upstream communications with network 102 devices through NIM 109 and cable modem 104. Module 204 includes an L1/L2 chipset 206. Chipset 206, which may be implemented as a single application specific integrated circuit (ASIC) or as multiple ASICs, includes processor circuitry configured to execute instructions and control operation of chipset 206 so as to carry out MoCA-based OSI layer 1 and layer 2 operations. Chipset 206 further includes memory storing instructions for execution by the processor circuitry as well as other data that is stored and/or retrieved by the processor circuitry. Chipset 206 also includes circuitry for modulation/demodulation and other operations necessary to receive and transmit MoCA-based RF signals. Chipset 206 performs conventional layer 1 and layer 2 operations associated with a coaxial cable communications system employing MoCA protocols. In other embodiments, an L1/L2 chipset may perform layer 1 and layer 2 operations associated with other types of media and protocols.

With regard to downstream communications, the layer 1 and layer 2 operations performed by chipset 206 include demodulation of signals received over coupler 201 and splitter 202, error detection and/or correction, decoding, and identification of layer 2 frames having a MAC address of module 204. As is known in the art, a MAC address is a device address that is permanently stored in a network communication device. In some embodiments, module 204 has a single MAC address (shown in FIG. 2 as MAC1) that is shared for all upstream and downstream communications through module 204. In other embodiments, and as described in more detail in connection with FIGS. 9A through 9E, a separate MAC address is associated with each virtual interface. Upon identifying a downstream layer 2 frame having an applicable MAC address, chipset 206 removes the layer 2 encapsulation of the frame and forwards the encapsulated layer 3 datagram to L3/L4 chipset 207 (described below). In the upstream direction, chipset 206 receives layer 3 upstream datagrams from L3/L4 chipset 207. Chipset 206 performs coding of the upstream datagrams for error detection and/or error correction and/or for other purposes, adds layer 2 encapsulation to the upstream datagrams to form upstream frames, determines when chipset 206 may access the physical medium for communication of the upstream frames, and modulates and transmits the upstream frames via splitter 202 and coupler 201.

L3/L4 chipset 207 is connected to and in communication with L1/L2 chipset 206. Chipset 207, which may also be implemented as one or more ASICs, includes processor circuitry configured to execute instructions and control operation of chipset 207 so as to carry out OSI layer 3 and layer 4 operations as described herein. Chipset 207 further includes memory storing instructions for execution by that processor circuitry as well as other data that is stored and/or retrieved by that processor circuitry. L3/L4 chipset 207 receives downstream L3 datagrams from L1/L2 chipset 206. After processing those downstream L3 datagrams as discussed below, chipset 207 outputs protocol data units (PDUs) to application, operating system and/or other software executing within STT 105. Those upper layer PDUs can include content data from the head end of network 102 or from a device within premises 101 (e.g., STT 106 or CPE device 108), provisioning, configuration or signaling data from the head end of network 102, or any other type of data that can be sent from or received by an application, operating system and/or other software program of STT 105. L3/L4 chipset also receives upstream PDUs from software programs of STT 105, processes those PDUs as is also discussed below, and forwards upstream layer 3 datagrams to chipset 206.

Although layer 1/layer 2 functions and layer 3/layer 4 functions are respectively divided across separate chipsets 206 and 207 in the embodiment of FIG. 2, this need not be the case. In some embodiments, for example, the layer 1/layer 2 operations of chipset 206 and the layer 3/layer 4 operations of chipset 207 can be performed by a single ASIC. In still other embodiments, the layer 3/layer 4 operations of chipset 207 could be performed by an ASIC or general purpose processor within STT 105 that performs other operations for STT 105 that are unrelated to communications through module 204.

STT 105 includes at least one processor 208, and at least one memory 209 accessible by processor 208 over bus 205, that are separate from module 204. Processor 208 is configured to execute instructions (hardwired within processor 208 and/or stored in memory 209) to control operation of STT 105. In addition to operations described below in connection with communication through module 105, processor 208 can also control conventional STT operations unrelated to communication through module 204 (e.g., channel selection, accepting user programming and instructions, encryption and decryption, processing of audio and video content, etc.). STT 105 also includes components found in a conventional STT (e.g., additional processors, additional memory, additional data busses, signal processors, power supplies, etc.) connected to data bus 205 and in communication with RF module 203, memory 209, processor 208 and/or module 204. Because details of such other components are not needed for understanding the embodiments described herein, the presence of those other components is only generally indicated in FIG. 2. In some embodiments, processor 208 could be configured to also perform the layer 3/layer 4 operations performed by L3/L4 chipset 207. In some such embodiments, processor 208 could receive downstream L3 datagrams from (and send upstream datagrams to) a module that only includes L1/L2 chipset 206.

As previously indicated, STT 105 may be configurable to transmit some upstream communications to the head end of network 102 via RF module 203 in a conventional manner. As explained below, however, some or all upstream communications in some embodiments are routed through multi-network module 204. In particular, application, operating system and/or other software programs executing on processor 208 (or on other components of STT 105) are configured to forward upstream data to module 204. Module 204 then communicates that data into the appropriate network through local coaxial plant 113.

FIGS. 3A through 3D are block diagrams showing exemplary operations of module 204 according to some embodiments. The examples of FIGS. 3A through 3D assume that STT 105 has previously been assigned an IP address in logical network A and a different IP address in logical network B. IP address formats in IPv4 and IPv6 are well known. For simplicity, however, the addresses of STT 105 in logical networks A and B will respectively be referred to as IPA1 and IPB1. Each of FIGS. 3A-3D shows L1/L2 chipset 206 and L3/L4 chipset 207 of module 204. As also shown in FIGS. 3A-3D, chipset 206 is configured to provide a shared interface, across which all communications through module 204 are made, that corresponds to OSI layers 1 and 2. Chipset 207 is configured to provide multiple virtual interfaces that correspond to higher layer protocols. In the embodiment of FIGS. 1-8, the virtual interfaces correspond to OSI layers 3 and 4. Moreover, each virtual interface corresponds to a separate logical network and IP address. Application, operating system and/or other software programs executing within STT 105 can communicate in logical network A by exchanging data with module 204 across virtual interface A. Similarly, software elements in STT 105 can communicate in logical network B by exchanging data with module 204 across virtual interface B.

Figure 3A:
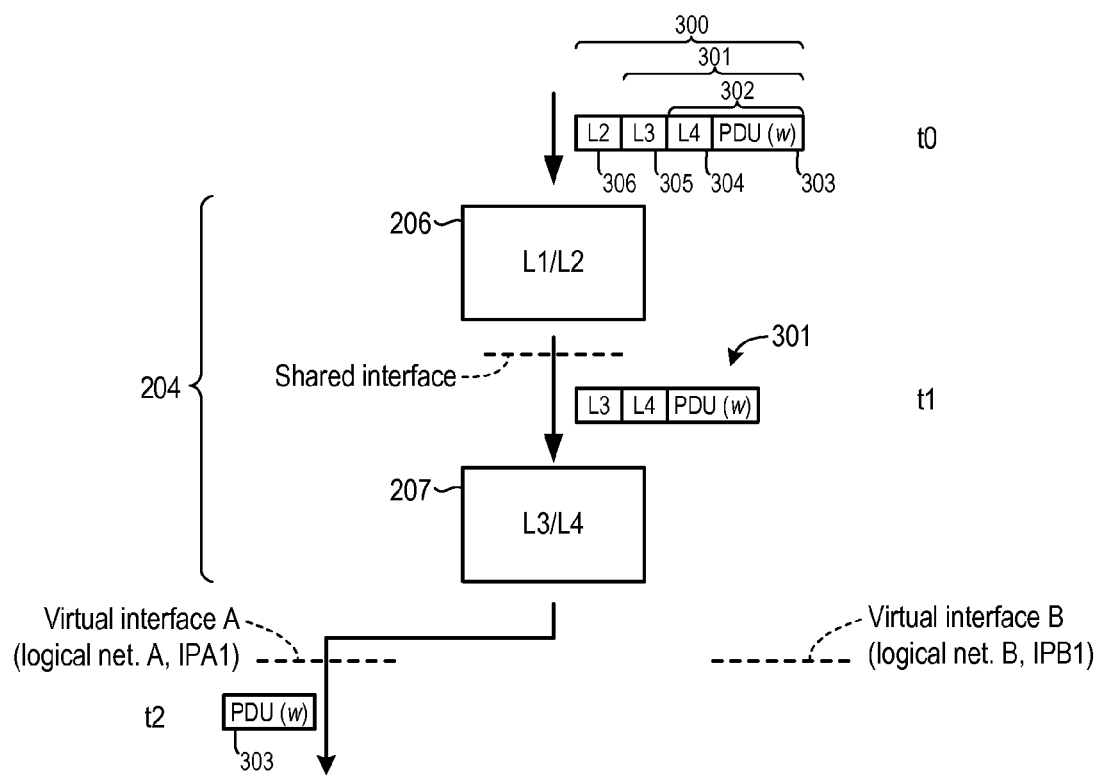
FIGS. 3A through 3D are block diagrams showing operations of the multi-network module of FIG. 2 according to some embodiments.

FIG. 3A shows operations performed by module 204 in connection with a data frame 300 being transmitted over local coaxial cable plant 113. Data frame 300 contains a PDU 303 intended for a software program w of STT 105 that is communicating in logical network A. PDU 303 is encapsulated with a layer 4 header 304 such as a transmission control protocol (TCP) or user datagram protocol (UDP) header to form a layer 4 message 302. Message 302 is encapsulated with a layer 3 header 305 such as an IP header to form a datagram 301. As is known in the art, such layer 3 and layer 4 encapsulation is used for communication of data across a network that may include segments having different types of communication media associated with different types of lower layer protocols. Datagram 301 is encapsulated with a layer 2 MoCA header 306 to form frame 300. As is also known in the art, layer 2 encapsulation is used to communicate data over a specific type of communication medium. Although not shown, encapsulation in layers 2, 3, and 4 may also include footers. PDU 303 may include additional layers of headers and other encapsulation according to protocols at higher OSI layers.

A modulated signal containing frame 300 is received by module 204 at time t0. After demodulating the signal, L1/L2 chipset 206 searches layer 2 header 306 for an appropriate MAC address. If L1/L2 chipset does not find an appropriate MAC address in a received frame, that frame is ignored. After finding MAC1 in header 306, L1/L2 chipset further processes frame 300 and outputs datagram 301 to L3/L4 chipset 207 across the shared interface at time t1. L3/L4 chipset 207 then searches layer 3 header 305 and/or layer 4 header 304 for IP address IPA1, for IP address IPB1, or for a multicast IP address applicable to either of logical network A or logical network B. Upon identifying address IPA1, L3/L4 chipset 207 determines that datagram 301 contains a PDU intended for a software program that is communicating in logical network A. Chipset 207 then outputs PDU 303 across virtual interface A at time t2. PDU 303 is made available to software program w by, e.g., placing PDU 303 in a queue corresponding to received logical network A messages (or a queue corresponding to received messages for program w).

Figure 3B:
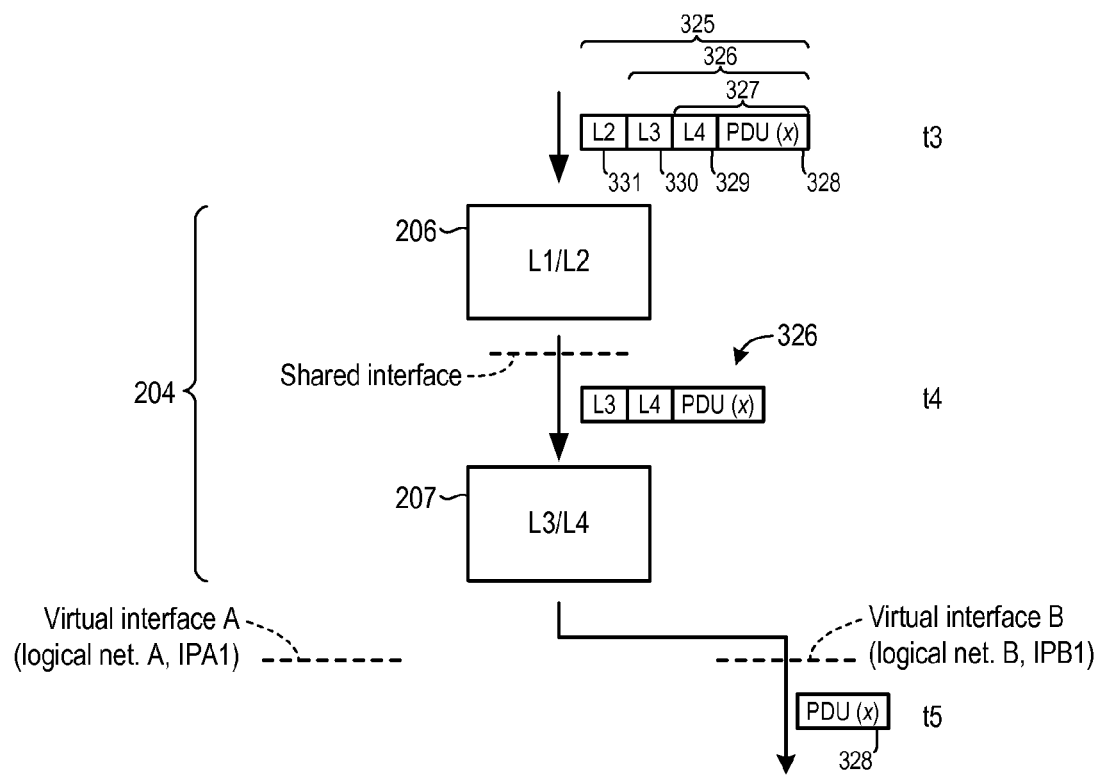

FIG. 3B shows operations performed by module 204 in connection with a data frame 325 containing a PDU 328 intended for a software program x of STT 105 that is communicating in logical network B. PDU 328 is encapsulated with a layer 4 header 329 to form a layer 4 message 327, with message 327 encapsulated with a layer 3 header 330 to form a datagram 326, and with datagram 326 encapsulated with a layer 2 MoCA header 331 to form frame 325. Module 204 receives a modulated signal containing frame 325 at time t3. After demodulating that signal, L1/L2 chipset 206 searches layer 2 header 331 for an appropriate MAC address. After finding MAC1 in header 331, L1/L2 chipset further processes frame 325 and outputs datagram 326 to L3/L4 chipset 207 across the shared interface at time t4. L3/L4 chipset 207 then searches layer 3 header 330 and/or layer 4 header 331 for IP address IPA1, for IP address IPB1, or for a multicast IP address applicable to either of logical network A or logical network B. Upon identifying address IPB1, L3/L4 chipset 207 determines that datagram 326 contains a PDU intended for a software program that is communicating in logical network B. Chipset 207 then outputs PDU 328 across virtual interface B at time t5. PDU 328 is made available to software program x by, e.g., placing PDU 328 in a queue corresponding to received logical network B messages (or a queue corresponding to received messages for program x).

Figure 3C:
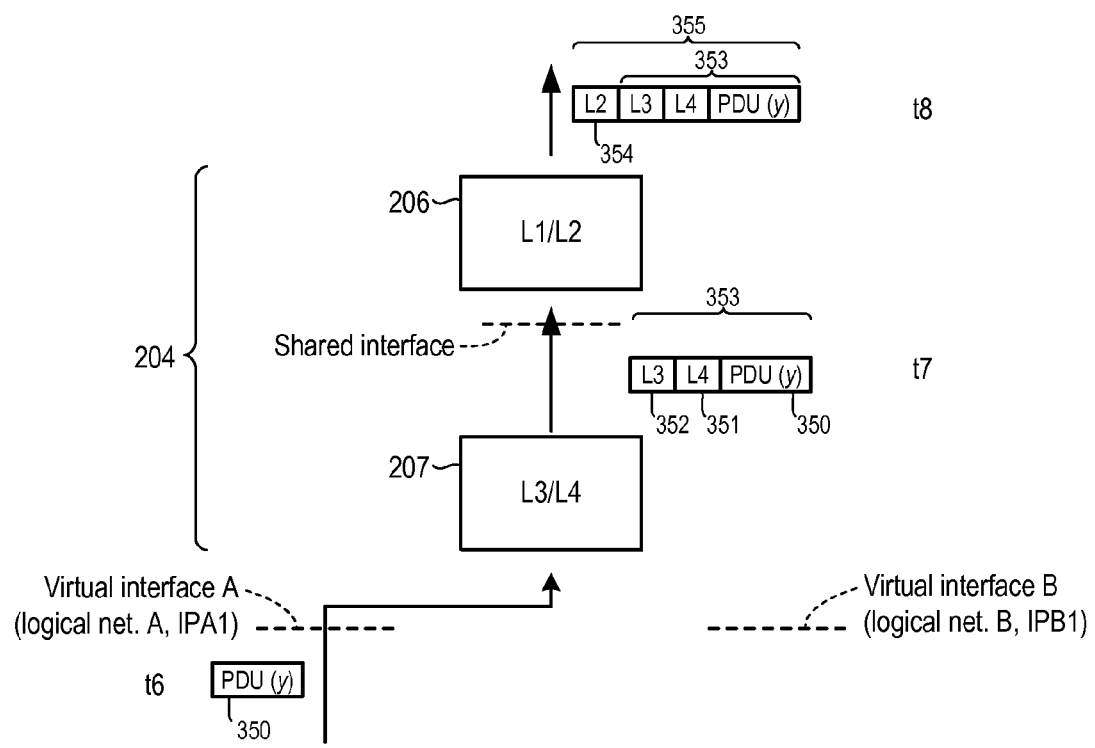

FIG. 3C shows operations performed by module 204 in connection with an upstream PDU 350 received by module 204 from a software component y sending upstream data in logical network A. Upon receiving PDU 350 across virtual interface A at time t6, L3/L4 chipset 207 determines the logical network in which PDU 330 is to be transmitted upstream. Chipset 207 can make this determination in several manners. In some embodiments, for example, processor 208 of STT 105 (FIG. 2) could execute a driver software program for interfacing with module 204. When forwarding a PDU to module 204 for upstream communication, that driver also provides other data identifying the appropriate logical network and other data (e.g., destination IP addresses) to be used as part of that communication. As another example, L3/L4 chipset 207 could store information in its memory identifying all software components communicating through logical network A or logical network B and signature data for each software component. That signature data can include features of various upper layer headers or other information sufficient to identify a PDU as being associated with a specific software component. The L3/L4 chipset could then be configured to examine an upstream PDU and determine the appropriate logical network and to extract other data to be used in the upstream communication.

After determining the logical network in which PDU 350 is to be transmitted, L3/L4 chipset 207 encapsulates PDU 350 with layer 3 and layer 4 headers. Those headers include the IP address of STT 105 in the determined logical network as a source IP address. In the example of FIG. 3C, L3/L4 chipset 207 determines that PDU 350 is to be sent in logical network A and forms datagram 353 by adding headers 351 and 352 containing IP address IPA1 as a source address. Datagram 353 is then forwarded to L1/L2 chipset across the shared interface at time t7. Upon receiving datagram 353, L1/L2 chipset 206 adds L2 encapsulation to form frame 355 and transmits frame 355 as a modulated signal onto local coaxial cable plant 113 at time t8.

Figure 3D:
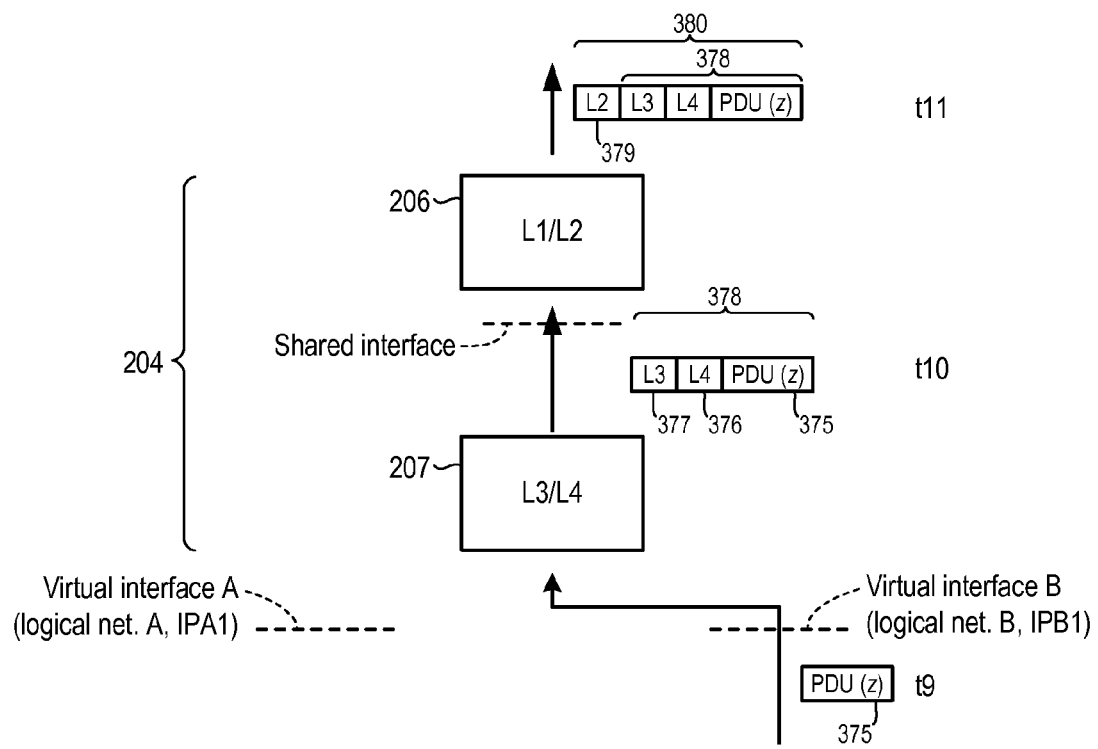

FIG. 3D is similar to FIG. 3C, but shows operations performed by module 204 in connection with a PDU 375 to be transmitted in logical network B from a software program z. PDU 375 is received by L3/L4 chipset 207 across virtual interface B at time t9. Chipset 207 determines that PDU 375 is to be transmitted in logical network B and adds headers 376 and 377 to form datagram 378 that is forwarded to L1/L2 chipset 206 across the shared interface at time t10. L1/L2 chipset adds layer 2 encapsulation 379 to form frame 380 and transmits frame 380 as a modulated signal onto local coaxial cable plant 113 at time t11.

Although each of the examples in FIGS. 3A-3D shows a different software program sending or receiving a PDU, a single software program could both send and receive over one of the virtual interfaces. In some cases, a software program may be configured to receive downstream data in a conventional manner through module 203 (FIG. 2) and send upstream data through one of the virtual interfaces. In still other cases, a software program may receive downstream data via one of the virtual interfaces and send upstream data in a conventional manner using module 203. In yet other cases, a software program may use multiple paths for upstream and/or downstream communications.

STT 106 is similar to STT 105, except that a multi-network module of STT 106 has a different MAC address. STT 106 and its multi-network module are configured to operate in a manner similar to that described for STT 105, except that the IP addresses of STT 106 in logical networks A and B would be different from the IP addresses of STT 105. For convenience, portions of the discussion herein thus focus on STT 105.

In other embodiments, the operations described in connection with FIGS. 3A through 3D may be performed in other hardware components. For example, in some embodiments in which L1/L2 chipset 206 and L3/L4 chipset 207 are combined into a single ASIC, the above described operations of L1/L2 chipset 206 may be performed by some elements of that single ASIC and the above described operations of L3/L4 chipset 207 may be performed by other elements of that single ASIC. As another example, and in embodiments in which the operations of L3/L4 chipset 207 are performed by processor 208, the above described operations of L3/L4 chipset 207 may be performed by processor 208.

Figure 4:
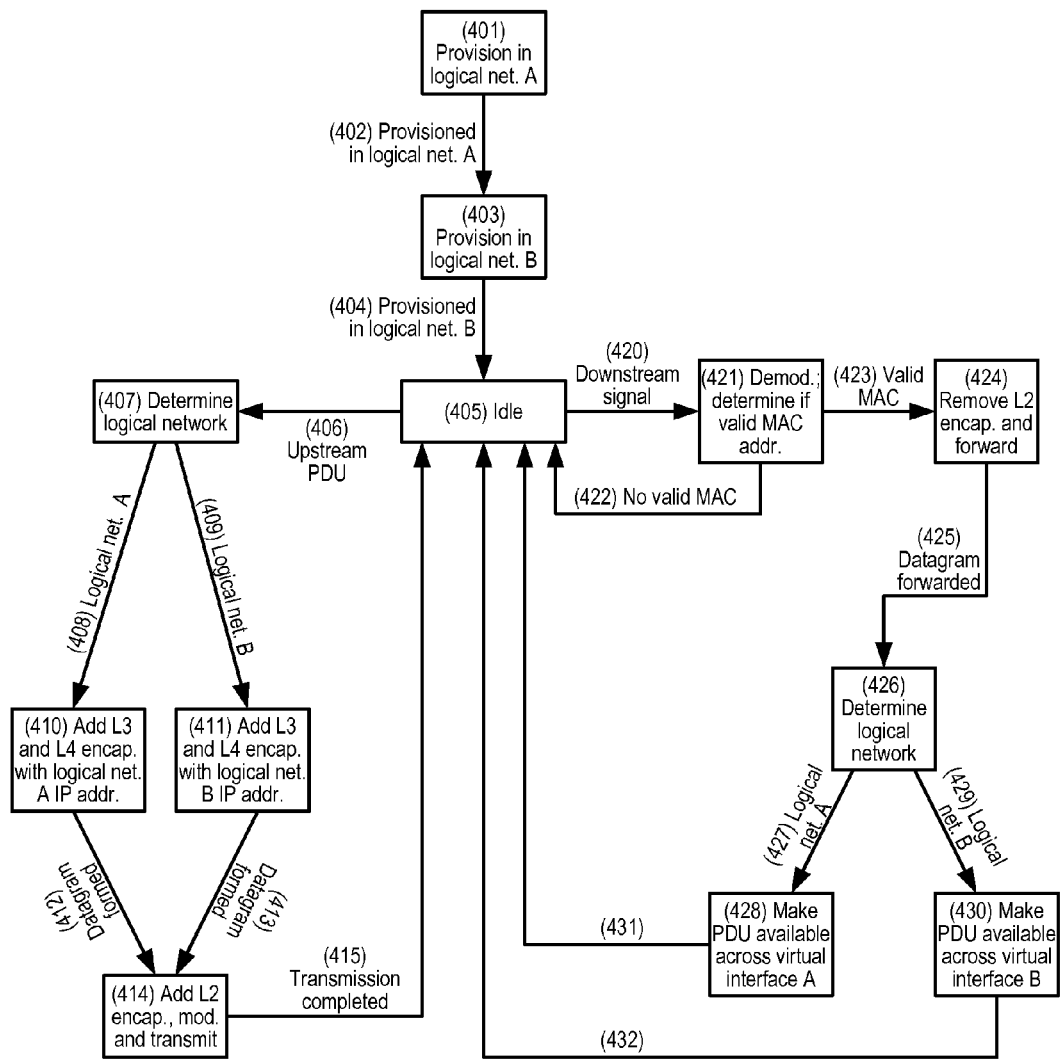
FIG. 4 is a state diagram showing various operations performed by a communication terminal according to some embodiments.

FIG. 4 is a diagram showing various states of STT 105 after connection to local coaxial plant 113. Similar operations would be performed by STT 106 after connection to plant 113. FIG. 4 assumes that cable modem 104, router 107, and NIMs 109 and 110 are already provisioned and operational. Upon connection, STT 105 enters a state 401 in which it communicates with one or more elements of network 102 and performs various self-provisioning activities. As part of those self-provisioning activities, and as discussed in more detail below, STT 105 obtains a logical network A IP address from DHCP server 114. STT 105 then transitions via path 402 to state 403 and obtains a logical network B IP address from router 107, as is also discussed below. The order of states 401 and 403 could be reversed, or states 401 and 403 could exist simultaneously (e.g., as part of separately executing instruction sets).

After provisioning, STT 105 transitions via path 404 to an idle state 405. If there is data to be sent upstream, STT 105 transitions via path 406 to state 407, where L3/L4 chipset 207 determines the logical network in which an upstream PDU is to be transmitted. If the PDU is to be sent in logical network A, STT 105 transitions via path 408 to state 410, where L3/L4 chipset 207 performs appropriate layer 3 and layer 4 encapsulation using the logical network A IP address. STT 105 then transitions on path 412 to state 414, where L1/L2 chipset 206 then performs layer 2 encapsulation and transmits the frame as a modulated signal onto local coaxial cable plant 113. STT 105 then returns via path 415 to idle state 405. If in state 407 L3/L4 chipset 207 determines a PDU is to be sent in logical network B, STT 105 transitions on path 409 to state 411. In state 411, chipset 207 performs similar operations as are described for state 410, but using the IP address of logical network B. STT 105 would then transition on path 413 to state 414.

If a downstream signal is received over local coaxial plant 113, STT 105 transitions from idle state 405 on path 420 to state 421. In state 421, L1/L2 chipset 206 demodulates the received signal and determines if it contains a frame with an appropriate MAC address. If not, STT 105 returns to idle state 405 on path 422. If the signal does include a frame with an appropriate MAC address, L1/L2 chipset 206 proceeds to state 424 on path 423. In state 424, L1/L2 chipset 206 removes the layer 2 encapsulation and forwards the resulting datagram to L3/L4 chipset 207. STT 105 then transitions on path 425 to state 426. In state 426, L3/L4 chipset 207 searches the layer 3 header and/or layer 4 header of the datagram for an IP address in logical network A or logical network B to determine the logical network in which the encapsulated PDU was communicated. Upon determining the logical network, STT 105 transitions to one of states 428 or 430 (on path 427 or on path 429, respectively) and places the PDU into a received message queue associated with the appropriate logical network. After queuing the received PDU in state 428 or state 430, STT 105 returns to idle state 405 on one of paths 431 or 432.

Although the operations of FIG. 4 are shown in one state diagram for purposes of convenience, various of those operations could be performed in parallel. For example, module 204 and processor 208 could be configured to simultaneously process upstream and downstream PDUs in separate independently-executing program threads.

Because each of STT 105 and STT 106 is configured to provide multiple virtual interfaces at a higher layer of the OSI model using a single lower layer interface, each STT will have multiple virtual interfaces sharing the same broadcast domain. For example, a message sent via virtual interface A of FIGS. 3A-3D to a broadcast destination IP address could potentially be processed by router 107 in logical network B and by an element in logical network A. This could raise concerns during DHCP (dynamic host configuration protocol) assignment of logical network A and logical network B IP addresses during the provisioning process (states 401 and 403 of FIG. 4). As is known in the art, the DHCP process is started by a client (such as STT 105 or STT 106) broadcasting a DHCP discover message. In the embodiment of FIG. 1, IP addresses in logical network A are assigned by DHCP server 114 and IP addresses in logical network B are assigned by router 107. However, DHCP server 114 will receive an STT's broadcast message seeking a logical network A IP address and that same STT's broadcast message seeking a logical network B address. Router 107 will similarly receive both messages. It is thus desirable that DHCP server 114 act on the messages from STTs 105 and 106 seeking logical network A IP addresses but ignore the messages from those STTs seeking logical network B IP addresses. It is similarly desirable that router 107 act on the messages from STTs 105 and 106 seeking logical network B IP addresses but ignore the messages from those STTs seeking logical network A IP addresses.

With regard to DHCP server 114 and logical network A, STTs 105 and 106 can be configured to specially identify DHCP discover messages seeking logical network A IP addresses as a logical network A DHCP discover message. This could be achieved by modifying one or more fields of the conventional DHCP discover message format in a manner that would only be recognized by DHCP server 114. DHCP server 114 could then be configured to respond to the DHCP discover messages identified as logical network A messages and ignore other DHCP messages. Alternatively, an intermediate network 102 element could be configured to forward logical network A DHCP discover messages to DHCP server 114 but drop logical network B DHCP discover messages. However, an operator of a network such as network 102 may not have control over devices such as router 107 in a subscriber premises. In such circumstances, other steps can be taken to prevent router 107 from responding to logical network A DHCP discover messages while allowing router 107 to respond to logical network B DHCP discover messages.

Figure 5:
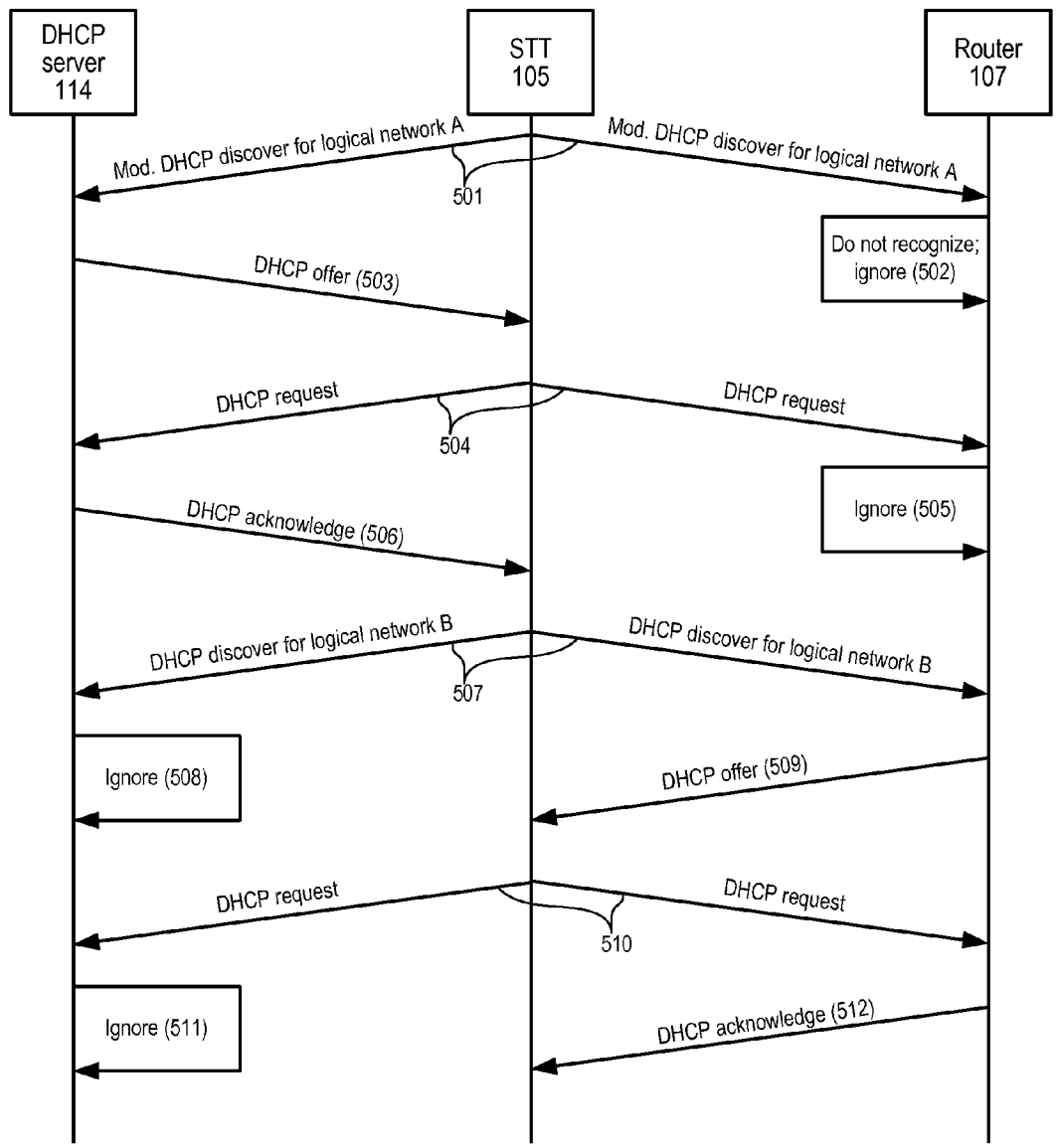
FIG. 5 is a communication diagram illustrating an example of a technique by which IP addresses can be assigned to virtual interfaces according to some embodiments.

FIG. 5 is a communication diagram illustrating an example of a technique in which IP addresses can be assigned in logical networks A and B to the virtual interfaces of module 204 in STT 105. Similar techniques could be used in connection with the multi-network module of STT 106. The technique of FIG. 5 is only an example, however, and other techniques (e.g., VLAN tagging) could be used. The below description of FIG. 5 describes various actions performed by processor 208 of STT 105 in connection with IP address assignment. In some embodiments, those actions could be performed by L3/L4 chipset 207 or by another component in STT 105.

As is known in the art, DHCP messages are usually transmitted as UDP messages. In some embodiments, processor 208 of STT 105 is configured to generate DHCP messages in connection with virtual interface A that are different from conventional DHCP messages as prescribed by applicable IETC (Internet Engineering Task Force) RFC (request for comment) documents. DHCP server 114 in network 102 is configured recognize these non-standard DHCP messages. Because those non-standard messages do not follow IETC protocols, however, a conventional router such as router 107 will typically ignore those messages.

At line 501 in FIG. 5, processor 208 of STT 105 broadcasts a modified DHCP discover message in connection with virtual interface A. The standard DHCP discover message format could be modified in any of various manners. For example, the message could have a source port number other than 68 (the normal source port for DHCP discover messages), a destination port number other than 67 (the normal destination port for DHCP discover messages), all "1" bits in one or more of the YIADDR and SIADDR address fields, etc. Router 107 receives but does not recognize the modified DHCP discover request message, as shown by line 502, and ignores the message. However, DHCP server 114 does recognize the message format. After checking the MAC1 address (added to the body of the modified DHCP discover message by processor 208) against a stored list of valid MAC addresses for authorized STTs, DHCP server 114 sends a conventional DHCP offer message (line 503). In response, STT 105 broadcasts a DHCP request message (line 504) accepting the offer from DHCP server 114. Because router 107 has not made a DHCP offer to STT 105, and as shown by line 505, router 107 will ignore the DHCP request message of line 504. In some embodiments, however, processor 208 of STT 105 can also be configured to modify the standard DHCP request message format so as to be unrecognizable by a conventional router. If processor 208 is configured to send a DHCP request message in a non-standard format, DHCP server 114 can likewise be configured to recognize that format. Upon receiving the DHCP request message of line 504, and as shown at line 506, DHCP server 114 sends a DHCP acknowledge message with a logical network A IP address, lease duration, and other configuration information.

After receiving an IP address for logical network A, and as shown by lines 507, STT 105 sends a DHCP discover message in connection with virtual interface B so as to obtain a logical network B IP address. So that this message will be acted on by router 107, the DHCP discover message of line 507 is in conventional format. DHCP server 114 is configured to ignore conventionally formatted DHCP discover messages that contain a MAC address of authorized STTs such as STT 105, and thus ignores the message of line 507 (as shown at line 508). In some embodiments, processor 208 of STT 105 can also (or alternatively) be configured to include certain predefined data in the options field of a conventional DHCP discover message. DHCP server 114 could then be configured to recognize that predefined data as an indication that the DHCP discover message should be ignored.

Because the DHCP discover message of line 507 is conventionally-formatted, the message is recognized by router 107. Router 107 then processes that message in a conventional manner by sending a DHCP offer message (line 509), to which STT 105 responds with a DHCP request message (line 510). DHCP server 114 ignores the request (line 511), but router 107 sends a DHCP acknowledge message with a logical network B IP address, lease duration, and other configuration information (line 512).

Figure 6:
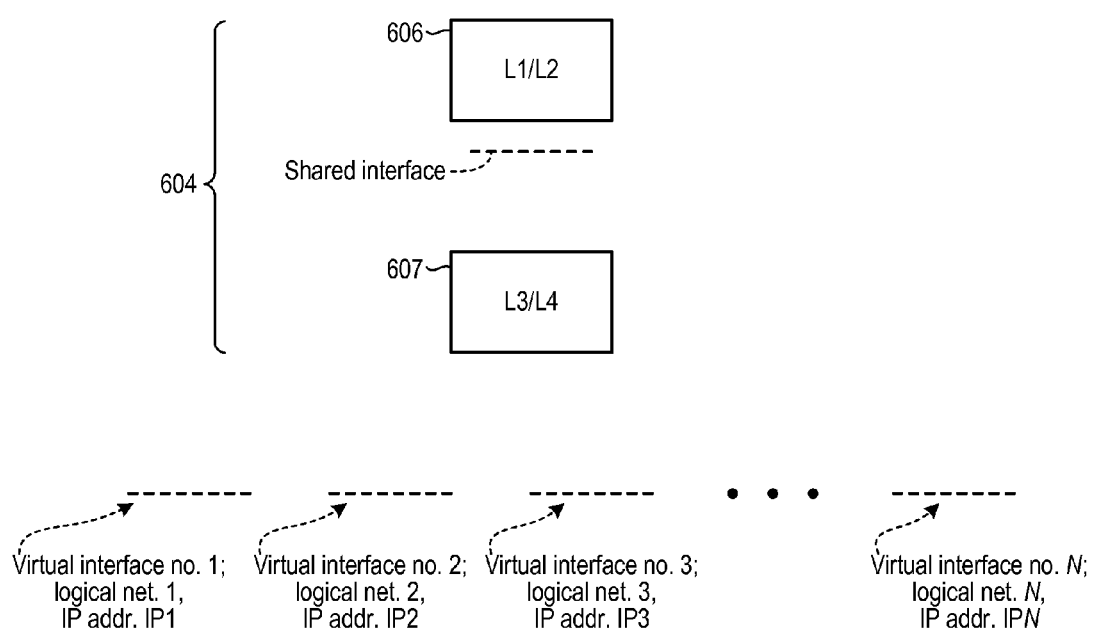
FIG. 6 is a diagram showing a multi-network module according additional embodiments.

Although embodiments described thus far include a multi-network module having two higher layer virtual interfaces communicating through a single lower layer interface, the invention is not limited in this regard. In other embodiments, three or more virtual interfaces communicate through a shared interface. FIG. 6 is a diagram showing one example of such a multi-network module 604 according to some such embodiments. Module 604 includes an L1/L2 chipset 606 and an L3/L4 chipset 607. Chipset 606 is similar to chipset 206 of FIGS. 2-3D. Chipset 607 is similar to chipset 207 of FIGS. 2-3d, but is configured to provide N virtual interfaces (with N being an arbitrary number) for communicating in one of N logical networks. For example, chipset 607 searches a received downstream datagram for an IP address corresponding to one of the virtual interfaces (IP1, IP2, IP3, . . . IPN) or to an appropriate multicast IP address and makes a PDU within that datagram available to the program(s) communicating in the logical network associated with that IP address. Similarly, chipset 607 receives upstream PDUs across one of the virtual interfaces, and creates a datagram using the appropriate IP address, and forwards the datagram to chipset 606.

Figure 7:
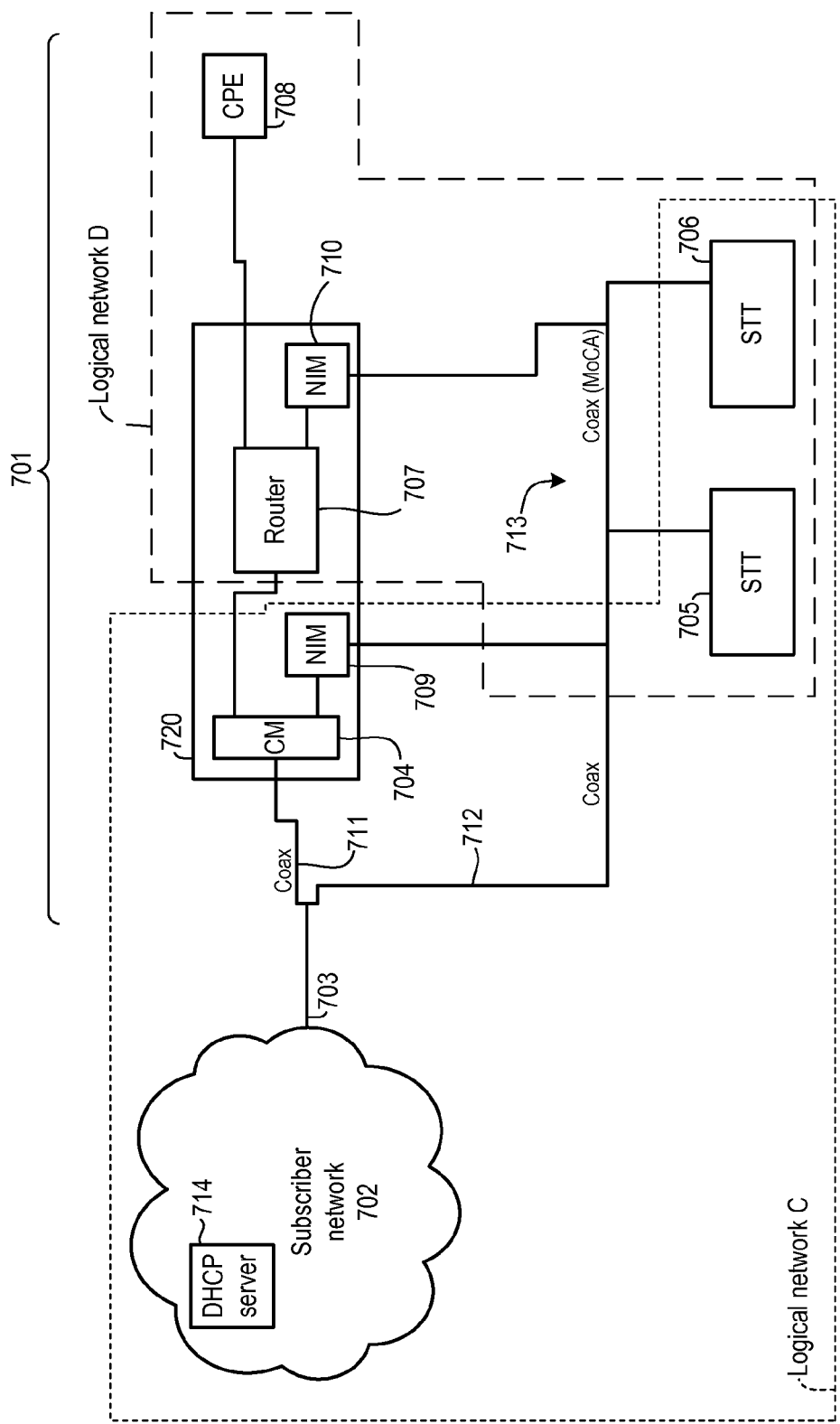
FIG. 7 is a block diagram showing a subscriber premises, served by an external physical network, having set top terminals (STTs) and a gateway device according to at least some additional embodiments.

FIG. 7 is a block diagram showing a subscriber premises 701 served by an external physical network 702. Components in the embodiment of FIG. 7 are structurally and operationally similar to components of FIG. 1 having a reference number offset by 600. For example, STT 705 of FIG. 7 is substantially the same as STT 105 of FIG. 1. The embodiment of FIG. 7 differs from the embodiment of FIG. 1 based on the incorporation of a cable modem, NIMs and a router into single premises gateway device 720. In the embodiment of FIG. 7, a first logical network C includes STT 705, STT 706, NIM component 709 of gateway 720, cable modem component 704 of gateway 720, DHCP server 714 and other head end elements of network 702. A second logical network D includes STT 705, STT 706, NIM component 810 of gateway 720, router component 707 of gateway 720 and CPE device 708. NIM components 709 and 710 could be consolidated into a single NIM configured to route frames to router 707 or CM 704 based on information in each frame corresponding to a particular virtual interface and logical network. In some such embodiments, a consolidated NIM component could be included in multiple logical networks.

Figure 8:
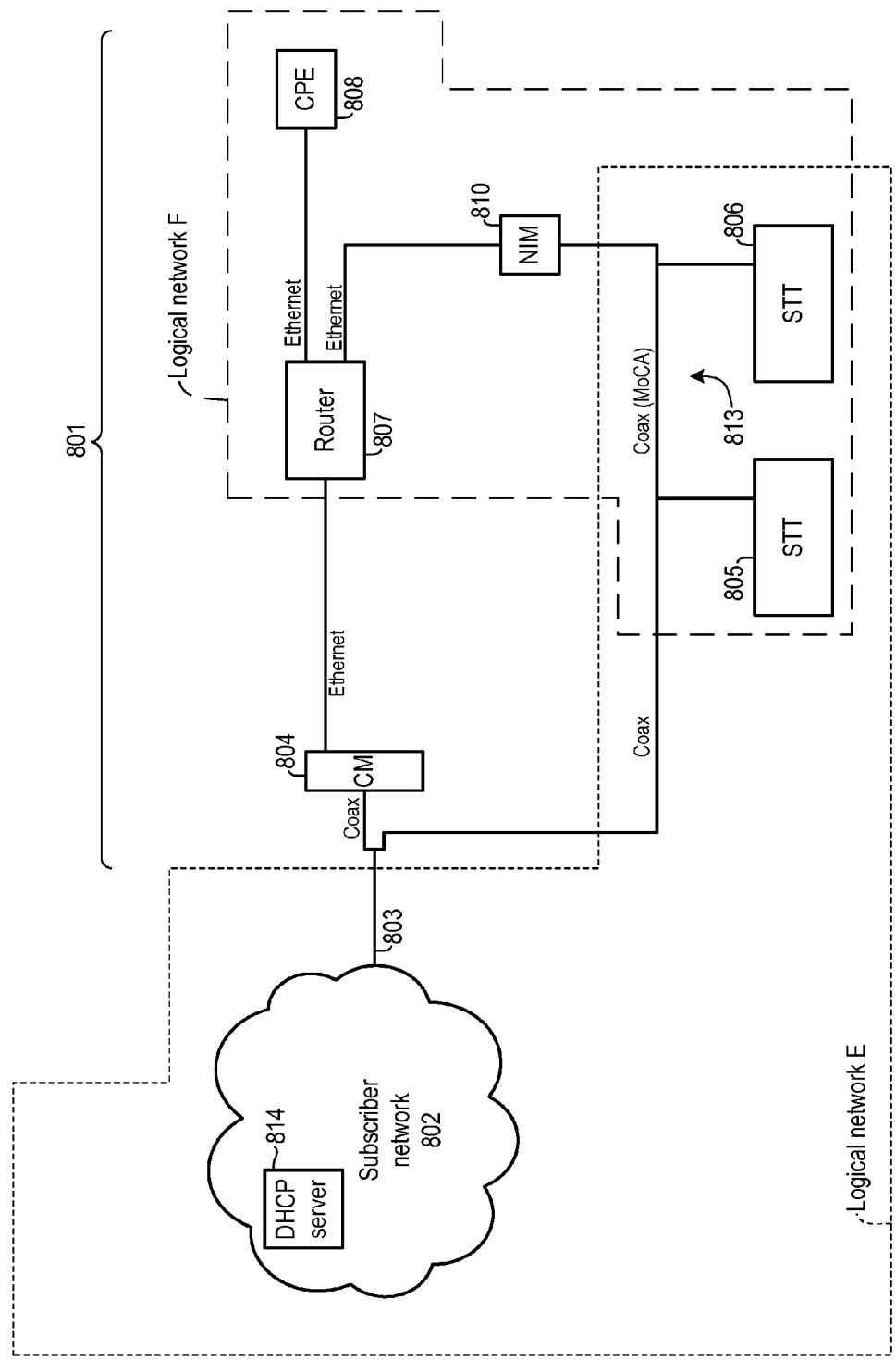
FIG. 8 is a block diagram showing a network topology in a subscriber premises according to further embodiments

A multi-network communication module having multiple virtual interfaces can also be used in topologies in which STTs do not use a separate cable modem for upstream communications with a head end. For example, FIG. 8 is a block diagram showing a subscriber premises 801 served by an external physical network 802. Network 802, DHCP server 814, cable modem 804, router 807, NIM 810 and CPE 808 are generally the same as network 102, DHCP server 114, cable modem 104, router 107, NIM 110 and CPE 108, respectively, of the embodiment of FIG. 1. STT 806 is generally the same as STT 106 of FIG. 1. Except as set forth below, STT 805 is generally similar to STT 105 of FIG. 1. A first logical network E includes STT 805, STT 806, DHCP server 814 and other head end elements of network 802. A second logical network F includes STT 805, STT 806, NIM 810, router 807 and CPE device 808.

In the FIG. 8 embodiment, STT 805 is configured to act as a proxy for upstream communications by STT 806 with the head end of network 802. When STT 806 needs to send an upstream communication to the head end, that message is sent to STT 805 in a MoCA-based communication (via local coax plant 813) using the logical network E virtual interface of the STT 806 multi-network module. A processor of STT 805 receives that message across the logical network E virtual interface of its multi-network module, and then transmits it upstream to the head end using a separate RF module similar to RF module 203 of FIG. 2. Other communications between STTs 805 and 806 or between one of those STTs and CPE device 808 occur through a logical network F virtual interface within each STT.

Although various embodiments have been described by example of STTs communicating through a MoCA interface, the invention is not limited in this regard. In other embodiments, an STT may use the above described techniques to communicate in multiple logical networks across multiple virtual interfaces that share a lower layer interface that complies with non-MoCA protocols. In still other embodiments, communication terminals other than STTs can implement the above described techniques for communicating in multiple logical networks using multiple virtual interfaces sharing a single interface at lower protocol layers. For example, a computer or other type of communication terminal in a local network may have a single Ethernet port with a single Ethernet layer 1/layer 2 interface or a single local wireless access (e.g., a Wi-Fi protocol such as that described by IEEE 802.11) port with a single wireless layer 1/layer 2 interface. Though that single port and layer 1/layer 2 interface, the communication terminal can simultaneously receive data (and have different network addresses in) separate logical networks and can send data from those separate addresses in the different logical networks.

Some embodiments may employ additional techniques to maintain a separation of data between logical networks sharing the same medium. For example, layer 2 data frames in one logical network could be encrypted with a first key, and layer 2 data frames in another logical network could be unencrypted or encrypted with a different second key. Pass phrases could be included in layer 2 encapsulation, with data frames in one logical network having one pass phrase and data frames in a second logical network having a different pass phrase.

Although certain embodiments described herein include a subscriber premises physical network topology with two STTs and a single CPE device, this is only for purposes of example. For example, a subscriber premises may have three or more STTs or other devices communicating in two (or more) logical networks, or may only have a single STT. As another example, more than one CPE device may be present. In still other embodiments, a single STT and multiple CPE devices are present. Techniques described herein can be used in topologies other than those described in connection with FIGS. 1, 7 and 8.

Various above-described embodiments include communication terminals having virtual interfaces that correspond to OSI layers 3 and 4, and shared interfaces corresponding to OSI layers 1 and 2. In other embodiments, a shared interface may correspond to operations typically associated with layer 1 protocols (e.g., modulation and demodulation) and only some (or perhaps no) operations associated with layer 2 protocols. One example of such an embodiment is illustrated in FIGS. 9A-9D, which are block diagrams showing exemplary operations by a module 904 according to some embodiments. Module 904 includes circuitry configured to carry out operations associated with protocols of layers 1-4 as described in more detail below. Circuitry associated with layer 1 operations is represented in FIGS. 9A-9D as block 901 ("L1"). Circuitry associated with layer 2, layer 3 and layer 4 operations is represented as block 904 ("L2/L3/L4"). However, circuitry for all of blocks 902 and 903 could be implemented as a single ASIC, or as multiple ASICs in which operations are distributed among separate chips in any manner.

Module 904 replaces module 204 in an STT that is otherwise similar to STT 105 described above. The examples of FIGS. 9A through 9D assume that this STT has replaced STT 105 in premises 101 described above. The examples of FIGS. 9A through 9D further assume the STT with module 904 has been assigned IP address IPA2 in logical network A and IP address IPB2 in logical network B.

Unlike module 204 described in connection with FIGS. 3A through 3D, module 904 includes virtual interfaces A' and B' that correspond to operations associated with layer 2 protocols. Each of virtual interfaces A' and B' has a separate layer 2 port and a separate MAC address. Virtual interface A' is used by the STT for communications in logical network A and corresponds to layers 2, 3 and 4, to IP address IPA2, and to MAC address MAC A. Virtual interface B is used by the STT for communications in logical network B and corresponds to layers 2, 3 and 4, to IP address IPB2, and to MAC address MAC B. Application, operating system and/or other software programs executing within the STT can communicate in logical network A by exchanging data with module 904 across virtual interface A'. Software elements in the STT can communicate in logical network B by exchanging data with module 904 across virtual interface B'.

Figure 9A:
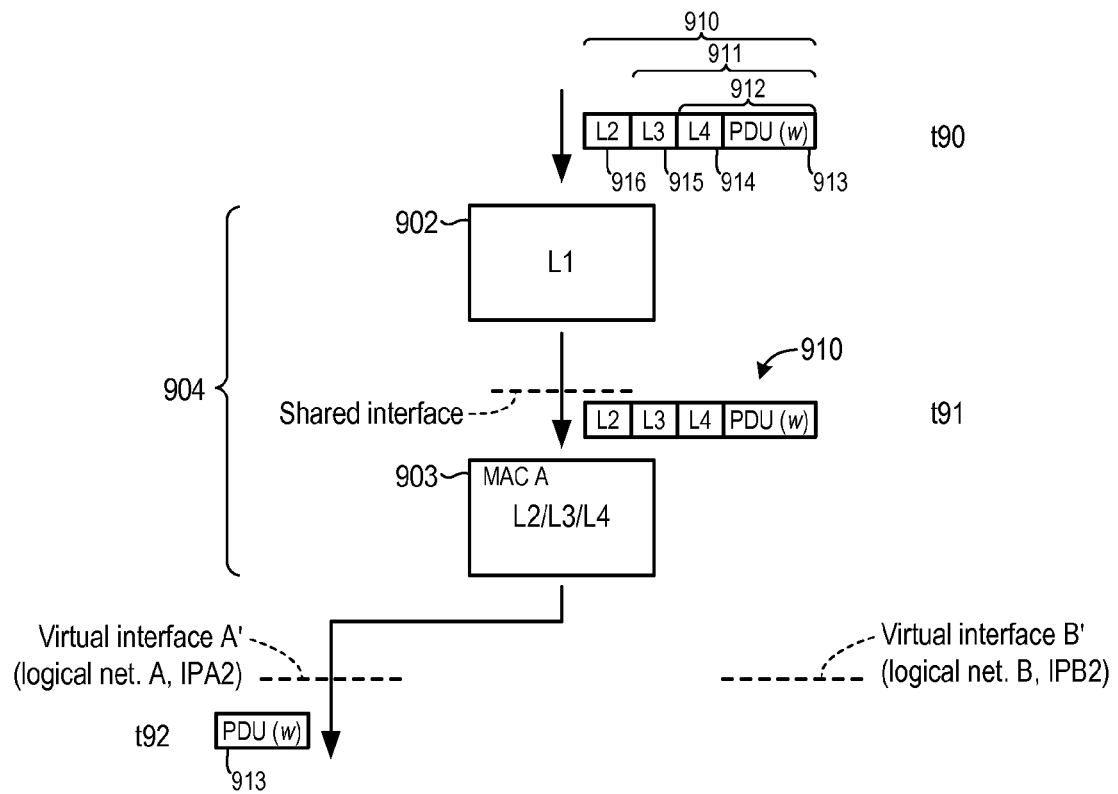
FIGS. 9A-9D are block diagrams showing operations by a multi-network module according to some additional embodiments.

FIG. 9A shows operations performed by module 904 in connection with a data frame 910 being transmitted over a local coaxial cable plant 113 to which the STT is connected. Data frame 910 contains a PDU 913 intended for a software program w of the STT that is communicating in logical network A. PDU 903 is encapsulated with a layer 4 header 914 such as a TCP or UDP header to form a layer 4 message 912. Message 912 is encapsulated with a layer 3 header 915 such as an IP header to form a datagram 911. Datagram 301 is encapsulated with a layer 2 MoCA header 916 to form frame 910.

A modulated signal containing frame 910 is received by module 904 at time t90. The signal is demodulated and passed by L1 circuitry 902 across a shared interface to L2/L3/L4 circuitry 903 at time t91. Circuitry 903 searches layer 2 header 916 for an appropriate MAC address. If circuitry 903 does not find an appropriate MAC address in a received frame, that frame is ignored. After finding MAC A in header 916, circuitry 903 further processes frame 910 and makes PDU 913 available to program w across virtual interface A' (e.g., by placing PDU 913 in a queue corresponding to received logical network A messages or in a queue corresponding to received messages for program w). Circuitry 903 is able to identify PDU 913 as being communicated in logical network A based on the MAC A address in L2 header 916. However, circuitry 903 may also verify that PDU 913 has been communicated in logical network A by checking to make sure that IP address IPA2 (or another appropriate IP address) is present in L3 header 915 and/or L4 header 914.

Figure 9B:
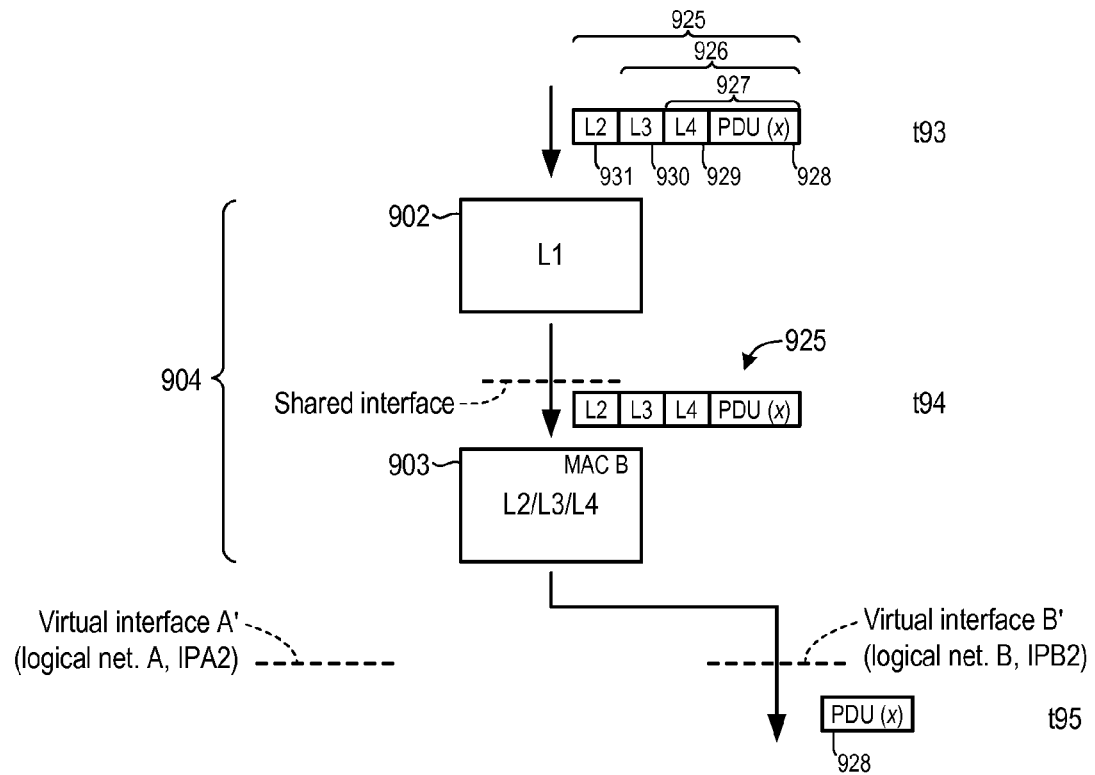

FIG. 9B shows operations performed by module 904 in connection with a data frame 925 containing a PDU 928 intended for a software program x of the STT, which program is communicating in logical network B. PDU 928 is encapsulated with a layer 4 header 929 to form a layer 4 message 927, with message 927 encapsulated with a layer 3 header 930 to form a datagram 926, and with datagram 926 encapsulated with a layer 2 MoCA header 931 to form frame 925. Module 904 receives a modulated signal containing frame 925 at time t93. The signal is demodulated and passed by L1 circuitry 902 across the shared interface to L2/L3/L4 circuitry 903 at time t94. Circuitry 903 searches layer 2 header 931 for an appropriate MAC address. After finding MAC B in header 931, circuitry 903 further processes frame 925 and makes PDU 913 available to program x across virtual interface B' (e.g., by placing PDU 928 in a queue corresponding to received logical network B messages or in a queue corresponding to received messages for program x). Circuitry 903 is able to identify PDU 928 as being communicated in logical network B based on the MAC B address in L2 header 931. However, circuitry 903 may also verify that PDU 928 has been communicated in logical network B by checking to make sure that IP address IPB2 (or another appropriate IP address) is present in L3 header 930 and/or L4 header 929.

Figure 9C:
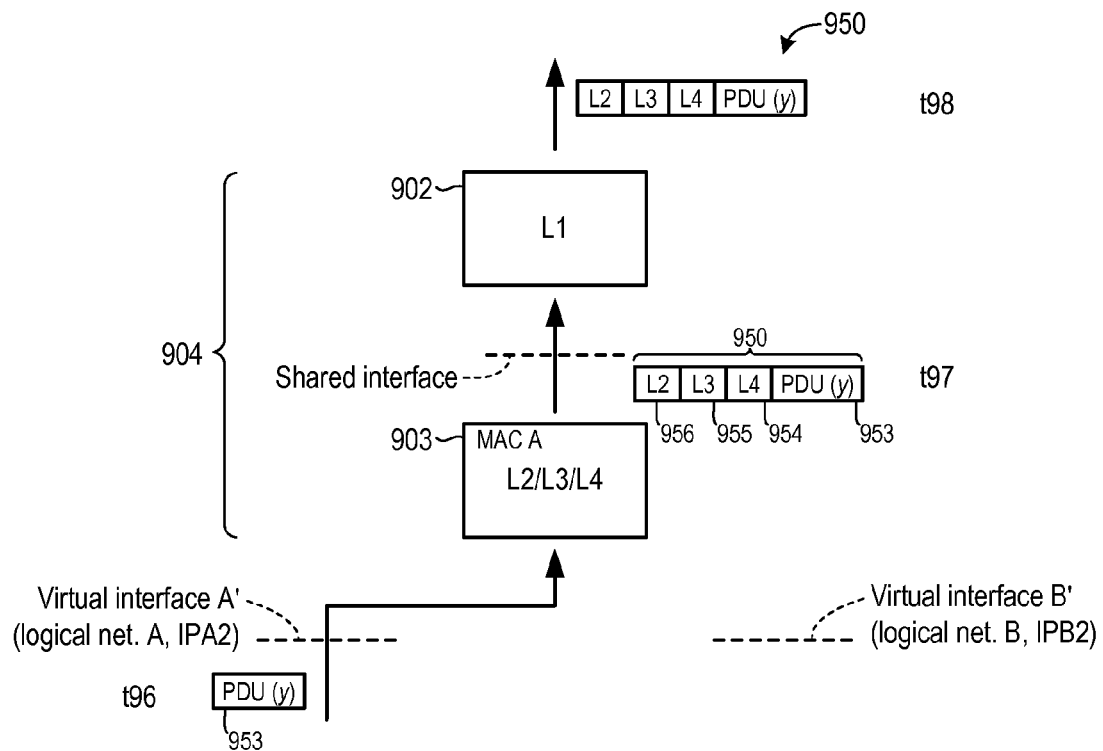

FIG. 9C shows operations performed by module 204 in connection with an upstream PDU 953 received by module 904 from a software component y sending upstream data in logical network A. Upon receiving PDU 953 across virtual interface A' at time t96, L2/L3/L4 circuitry 903 determines the logical network in which PDU 953 is to be transmitted upstream. Circuitry 903 can make this determination in any of several manners (including any of those described in connection with FIGS. 3A-3B). After determining the logical network in which PDU 953 is to be transmitted, circuitry 903 encapsulates PDU 953 with layer 4 and layer 3 headers 954 and 955 that include IPA2 as an IP source address. Circuitry 903 also adds L2 header 956 that includes MAC A as a source MAC address, thereby forming frame 950. After receiving frame 950 across the shared interface at time t97, L1 circuitry 902 transmits frame 950 as a modulated signal onto local coaxial cable plant 113 at time t98.

Figure 9D:
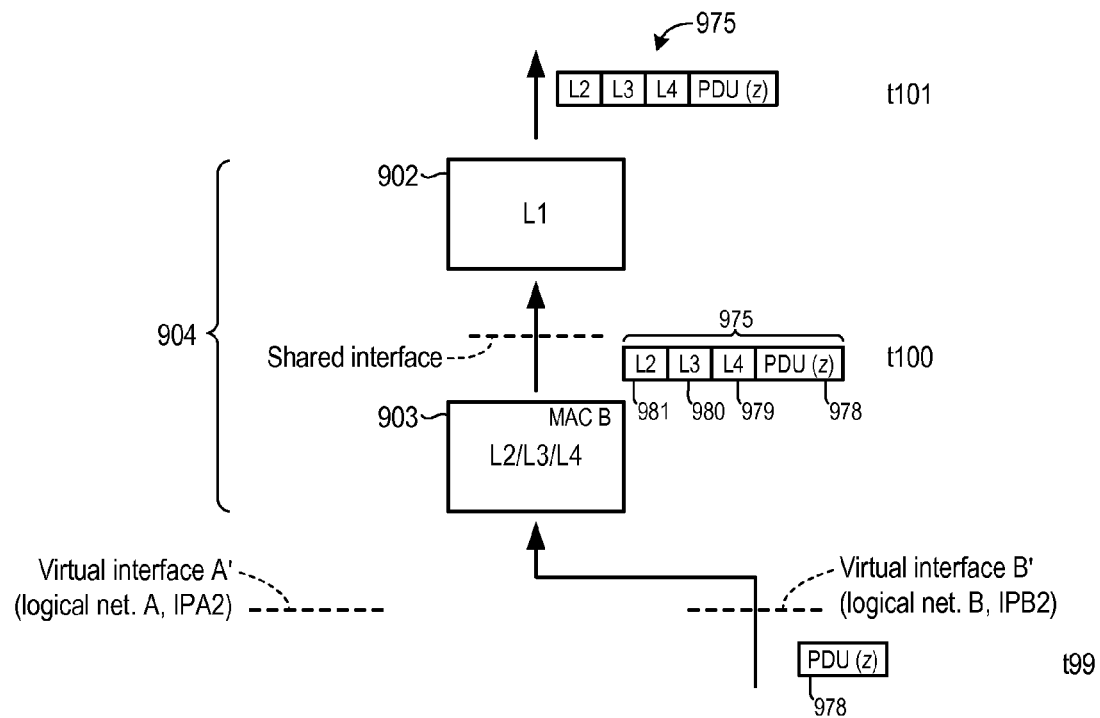

FIG. 9D is similar to FIG. 9C, but shows operations performed by module 904 in connection with a PDU 978 to be transmitted in logical network B from a software program z. PDU 978 is received by circuitry 903 across virtual interface B' at time t99. Circuitry 903 determines that PDU 978 is to be transmitted in logical network B and adds headers 979 and 980 containing IP B2 as an IP source address, and then adds header 981 (containing MAC B as a source MAC address) to form frame 975. Frame 975 is forwarded across the shared interface to circuitry 902 at time t100. Circuitry 902 transmits frame 975 as a modulated signal onto local coaxial cable plant 113 at time t101.

Figure 10:
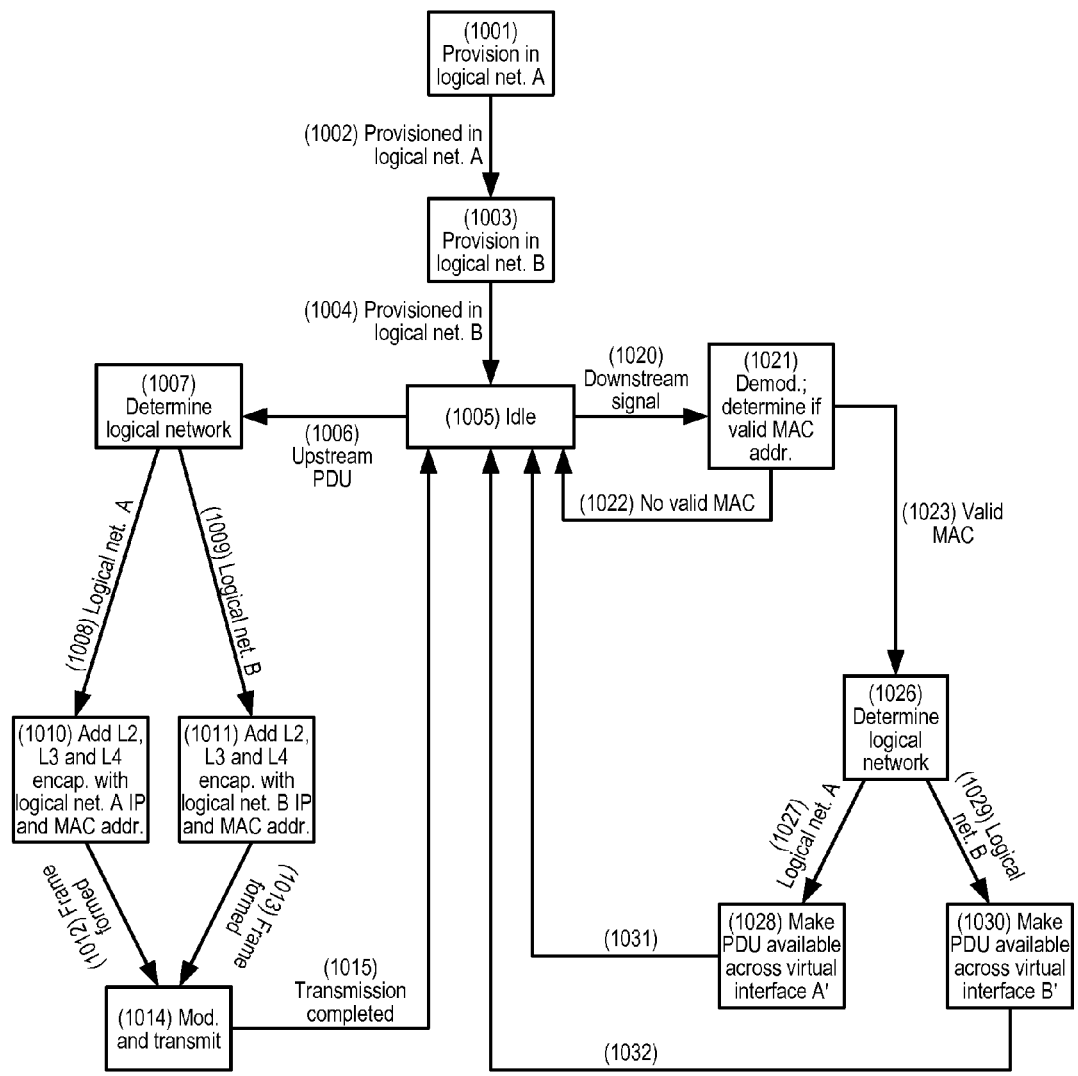
FIG. 10 is a state diagram showing various operations performed by a communication terminal according to some additional embodiments.

FIG. 10 is a diagram similar to FIG. 4 and shows various states of the STT having module 904 after connection to local coaxial plant 113. FIG. 10 similarly assumes that cable modem 104, router 107, and NIMs 109 and 110 are already provisioned and operational. Upon connection, the STT enters a state 1001 in which it communicates with one or more elements of network 102 and performs various self-provisioning activities. As part of those self-provisioning activities, the STT obtains a logical network A IP address from DHCP server 114 in a manner similar to that described in connection with FIG. 5. The STT then transitions via path 1002 to state 1003 and obtains a logical network B IP address from router 107, in a manner also similar to that described in connection with FIG. 5. The order of states 1001 and 1003 could be reversed, or states 1001 and 1003 could exist simultaneously (e.g., as part of separately executing instruction sets).

After provisioning, the STT transitions via path 1004 to an idle state 1005. If there is data to be sent upstream, the STT transitions via path 1006 to state 1007, where the L2/L3/L4 circuitry 903 determines the logical network in which an upstream PDU is to be transmitted. If the PDU is to be sent in logical network A, the STT transitions via path 1008 to state 1010, where circuitry 903 performs appropriate layer 2, layer 3 and layer 4 encapsulation using the logical network A IP address and the virtual interface A' MAC address. The STT then transitions on path 1012 to state 1014, where L1 circuitry 902 transmits the frame as a modulated signal onto local coaxial cable plant 113. The STT then returns via path 1015 to idle state 1005. If in state 1007 circuitry 903 determines a PDU is to be sent in logical network B, the STT transitions on path 1009 to state 1011, where circuitry 903 performs similar operations as are described for state 1010, but using the IP address of logical network B and the MAC address for virtual interface B'. The STT would then transition on path 1013 to state 1014.

If a downstream signal is received over local coaxial plant 113, the STT transitions from idle state 1005 on path 1020 to state 1021. In state 1021, L1 circuitry 902 demodulates the received signal and passes a frame to L2/L3/L4 circuitry 903 across the shared interface. Also in state 1021, circuitry 903 determines if the frame contains an appropriate MAC address. If not, the STT returns to idle state 1005 on path 1022. If the frame includes an appropriate MAC address, the STT proceeds to state 1026 on path 1023. In state 1026, circuitry 903 determines the logical network in which the PDU encapsulated by the received frame was communicated. Upon determining the logical network, the STT transitions to one of states 1028 or 1030 (on path 1027 or on path 1029, respectively) and places the PDU into a received message queue associated with the appropriate logical network. After queuing the received PDU in state 1028 or state 1030, the STT returns to idle state 1005 on one of paths 1031 or 1032.

Some embodiments having a multi-network module such as module 904 described above may also include other features described in connection with other multi-network modules. For example, a multi-network module similar to module 904 could be configured to provide more than two virtual interfaces so as to permit an STT or other device to communicate in more than two logical networks. As another example, an STT or other device could have a multi-network module similar to module 904 and be used in connection with a premises gateway device 720 (FIG. 7) or be configured for use in a topology such as is shown in FIG. 8 (or in some other topology). Similarly, a multi-network module similar to module 904 could be configured for use in a non-MoCA environment.

In still other embodiments, a shared interface could correspond to still other locations in a protocol stack. For example, a shared interface could correspond to layer 1 and to some operations associated with layer 2, with multiple virtual interfaces corresponding to other layer 2 operations and to higher level protocols. A shared interface could similarly correspond to a location in a protocol stack that does not fit the OSI reference model.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. The features of the embodiments described herein may be combined in all possible combinations of methods, apparatus, modules, systems, and computer program products.

The invention claimed is:

1. A method comprising:
    communicating, by a communication terminal that is part of a first logical network for communicating with one or more first computing devices of a user location and that is part of a second logical network for communicating with one or more second computing devices of a service provider location, across a first virtual interface of the communication terminal, first data associated with the first logical network, wherein the first virtual interface corresponds to a first address applicable to the communication terminal in the first logical network but not in the second logical network;
    encapsulating, by the communication terminal, the first data, resulting in encapsulated first data that comprises a media access control (MAC) address applicable to the communication terminal, wherein the MAC address applicable to the communication terminal is different from any other MAC address applicable to each other device in the first logical network and the second logical network;
    causing transmission, by the communication terminal to at least one of the one or more first computing devices via a physical network interface of the communication terminal, of the encapsulated first data using one or more Multimedia over Coaxial Alliance (MoCA)-based communications; and
    causing transmission, by the communication terminal to at least one of the one or more second computing devices via a second virtual interface of the communication terminal and the physical network interface, of second data using one or more non-MoCA-based communications, wherein the second data is associated with the second logical network, and wherein the second virtual interface corresponds to a second address applicable to the communication terminal in the second logical network but not in the first logical network.

2. The method of claim 1, wherein the causing transmission of the second data comprises communicating, by the communication terminal, across the second virtual interface, the second data.

3. The method of claim 1, wherein the physical network interface is joined to a physical network by a coaxial cable, and
    wherein the physical network comprises portions in which devices communicate across a communication medium different from the coaxial cable.

4. The method of claim 1, wherein the communication terminal comprises a set top terminal and wherein the physical network interface is joined to a physical network by a coaxial cable.

5. The method of claim 1, wherein the first address comprises a first Internet Protocol (IP) address and wherein the second address comprises a second IP address.

6. The method of claim 1, wherein the first logical network comprises a local area network for the user location, and
    wherein the second logical network comprises a wide area network for the service provider location.

7. The method of claim 1, further comprising:
    receiving the first address from a first address assigning element of the user location; and
    receiving the second address from a second address assigning element of the service provider location.

8. The method of claim 1, wherein the communication terminal comprises a first set top terminal,
    wherein the one or more first computing devices comprises a router of the user location and a user computing device of the user location,
    wherein the first logical network comprises the one or more first computing devices and the first set top terminal, and wherein the second logical network comprises the one or more second computing devices, the first set top terminal and a cable modem of the user location, but excludes the router and the user computing device.

9. The method of claim 8, wherein the first logical network and the second logical network both comprise a second set top terminal of the user location.

10. The method of claim 1, wherein the encapsulating the first data comprises:
encapsulating the first data with one or more first headers that comprise the first address as a source address, and
encapsulating the first data with one or more MoCA headers; and
wherein the method further comprises:
encapsulating the second data with one or more second headers that comprise the second address as a source address.

11. A method comprising:
communicating, by a communication terminal that is part of a first logical network for communicating with one or more first computing devices within a user premises and that is part of a second logical network for communicating with one or more second computing devices outside the user premises, across a first virtual interface within the communication terminal, first data that is associated with the first logical network, wherein the first virtual interface corresponds to a first address applicable to the communication terminal in the first logical network but not in the second logical network;
encapsulating, by the communication terminal, the first data, resulting in encapsulated first data that comprises a media access control (MAC) address applicable to the communication terminal, wherein the MAC address applicable to the communication terminal is different from any other MAC address applicable to each other device in the first logical network and the second logical network;
causing transmission, by the communication terminal to at least one of the one or more first computing devices via a physical network interface of the communication terminal, of the encapsulated first data using one or more Multimedia over Coaxial Alliance (MoCA)-based communications; and
causing transmission, by the communication terminal to at least one of the one or more second computing devices via a second virtual interface within the communication terminal and the physical network interface, of second data using one or more non-MoCA-based communications, wherein the second data is associated with the second logical network, and wherein the second virtual interface corresponds to a second address applicable to the communication terminal in the second logical network but not in the first logical network.

12. The method of claim 11, wherein the causing transmission of the second data comprises communicating, by the communication terminal, across the second virtual interface, the second data.

13. The method of claim 11, wherein the physical network interface is joined to a physical network by a coaxial cable, and
wherein the physical network comprises portions in which devices communicate across a communication medium different from the coaxial cable.

14. The method of claim 11, wherein the communication terminal comprises a set top terminal and wherein the physical network interface is joined to a physical network by a coaxial cable.

15. The method of claim 11, wherein the first address comprises a first Internet Protocol (IP) address and wherein the second address comprises a second IP address.

16. The method of claim 11, wherein the first logical network comprises a local area network within the user premises, and
wherein the second logical network comprises a wide area network.

17. The method of claim 11, further comprising:
receiving the first address from a first address assigning element within the user premises; and
receiving the second address from a second address assigning element outside the user premises.

18. The method of claim 11, wherein the communication terminal comprises a first set top terminal,
wherein the one or more first computing devices comprises a router within the user premises and a user computing device within the user premises,
wherein the first logical network comprises the one or more first computing devices and the first set top terminal, and
wherein the second logical network comprises the one or more second computing devices, the first set top terminal and a cable modem within the user premises, but excludes the router and the user computing device.

19. The method of claim 18, wherein the first logical network and the second logical network both comprise a second set top terminal within the user premises.

20. The method of claim 11, wherein the encapsulating the first data comprises:
encapsulating the first data with one or more first headers that comprise the first address as a source address, and
encapsulating the first data with one or more MoCA headers; and
wherein the method further comprises:
encapsulating the second data with one or more second headers that comprise the second address as a source address.

21. A method comprising:
communicating, by a communication terminal that is part of a first logical network for communicating with one or more first computing devices within a user premises and that is part of a second logical network for communicating with one or more second computing devices outside the user premises, across a second virtual interface within the communication terminal, second data that is associated with the second logical network, wherein the second virtual interface corresponds to a second address applicable to the communication terminal in the second logical network but not in the first logical network;
encapsulating, by the communication terminal, the second data, resulting in encapsulated second data that comprises a media access control (MAC) address applicable to the communication terminal, wherein the MAC address applicable to the communication terminal is different from any other MAC address applicable to each other device in the first logical network and the second logical network;
causing transmission, by the communication terminal to at least one of the one or more second computing devices via a physical network interface of the communication terminal, of the encapsulated second data using one or more non-Multimedia over Coaxial Alliance (MoCA)-based communications; and causing transmission, by the communication terminal to at least one of the one or more first computing devices via a first virtual interface within the communication terminal and the physical network interface, of first data using one or more MoCA-based communications, wherein the first data is associated with the first logical network, and wherein the first virtual interface corresponds to a first address applicable to the communication terminal in the first logical network but not in the second logical network.

22. The method of claim 21, wherein the first address comprises a first Internet Protocol (IP) address and wherein the second address comprises a second IP address.

23. The method of claim 21, wherein the first logical network comprises a local area network within the user premises, and wherein the second logical network comprises a wide area network.

24. The method of claim 21, wherein the communication terminal comprises a set top terminal, wherein the one or more first computing devices comprises a router within the user premises and a user computing device within the user premises, wherein the first logical network comprises the one or more first computing devices and the set top terminal, and wherein the second logical network comprises the one or more second computing devices, the set top terminal and a cable modem within the user premises, but excludes the router and the user computing device.

25. The method of claim 21, wherein the encapsulating the first data comprises:

encapsulating the first data with one or more first headers that comprise the first address as a source address, and encapsulating the first data with one or more MoCA headers.

* * * * *

UNITED STATES PATENT AND TRADEMARK OFFICE
CERTIFICATE OF CORRECTION

| | |
|---|---|
| PATENT NO. | : 9,832,070 B2 |
| APPLICATION NO. | : 12/618502 |
| DATED | : November 28, 2017 |
| INVENTOR(S) | : Ross Gilson |

Page 1 of 1

It is certified that error appears in the above-identified patent and that said Letters Patent is hereby corrected as shown below:

In the Specification

Column 2, Brief Description of the Drawings, Line 61:
Please after "embodiments" insert --.--

Column 7, Detailed Description, Line 1:
Delete "105," and insert --204,--

Column 8, Detailed Description, Line 44:
Delete "331" and insert --329--

Column 8, Detailed Description, Line 60:
Delete "330" and insert --350--

Column 13, Detailed Description, Line 3:
Delete "2-3d," and insert --2-3D,--

Column 15, Detailed Description, Line 24:
Delete "903" and insert --913--

Signed and Sealed this
Twenty-sixth Day of March, 2019

Andrei Iancu
*Director of the United States Patent and Trademark Office*